US012764828B2

(12) United States Patent
Park et al.

(10) Patent No.: US 12,764,828 B2
(45) Date of Patent: Oct. 13, 2026

(54) METHOD FOR TRANSMITTING AND RECEIVING SIDELINK DATA AND DEVICE FOR SAME IN WIRELESS COMMUNICATION SYSTEM

(71) Applicant: LG ELECTRONICS INC., Seoul (KR)

(72) Inventors: Giwon Park, Seoul (KR); Hanbyul Seo, Seoul (KR); Seoyoung Back, Seoul (KR); Jongwoo Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 289 days.

(21) Appl. No.: 18/687,610

(22) PCT Filed: Sep. 2, 2022

(86) PCT No.: PCT/KR2022/013204
§ 371 (c)(1),
(2) Date: Feb. 28, 2024

(87) PCT Pub. No.: WO2023/033591
PCT Pub. Date: Mar. 9, 2023

(65) Prior Publication Data

US 2025/0142669 A1 May 1, 2025

(30) Foreign Application Priority Data

Sep. 3, 2021 (KR) ........................ 10-2021-0117635
Sep. 3, 2021 (KR) ........................ 10-2021-0117822

(51) Int. Cl.
*H04W 76/28* (2018.01)
*H04L 1/1867* (2023.01)

(52) U.S. Cl.
CPC ............. *H04W 76/28* (2018.02); *H04L 1/188* (2013.01)

(58) Field of Classification Search
None
See application file for complete search history.

(56) References Cited

FOREIGN PATENT DOCUMENTS

| | | | | |
|---|---|---|---|---|
| WO | WO-2021039521 A1 * | 3/2021 | | C01B 32/28 |
| WO | 2021160495 A1 | 8/2021 | | |

OTHER PUBLICATIONS

Sharp, "Summary of [POST114-e][704][V2X/SL] How to make sure Rel-16 UEs not supporting SL DRX are not involved in SL communication in DRX manner (Sharp)", R2-2107303, Aug. 6, 2021, XP052034029 (Year: 2021).*

(Continued)

*Primary Examiner* — Stuart D Bennett
(74) *Attorney, Agent, or Firm* — BRYAN CAVE LEIGHTON PAISNER LLP

(57) ABSTRACT

A method of a second user equipment (UE) for receiving sidelink data in a wireless communication system comprises receiving configuration information related to a resource pool for sidelink communication from a base station, receiving sidelink control information (SCI) from a first UE, and receiving the sidelink data from the first UE based on the SCI. The SCI is received based on a monitoring related to the SCI. Based on a slot in which the SCI is received, an active time related to sidelink (SL) discontinuous reception (DRX) is determined. Based on a resource pool including the slot in which the SCI is received, whether to perform an operation related to the SL DRX is determined.

6 Claims, 18 Drawing Sheets

(56) References Cited

OTHER PUBLICATIONS

Vivo, "Left issues on SL DRX", R2-2105352, May 11, 2021, XP052006987 (Year: 2021).*
CATT, GOHIGH, "Discussion on sidelink resource allocation enhancements for power saving", 3GPP TSG RAN WG1 #106-e, R1-2108238, e-Meeting, Aug. 16-27, 2021.
Apple, "Discussion on Remaining issues of SL DRX configuration", 3GPP TSG-RAN WG2 Meeting #115-e, R2-2107626, e-Online, Aug. 16-27, 2021.
Lenovo, Motorola Mobility, "DRX Configuration for UC BC GC and its interaction with Sensing", 3GPP TSG-RAN WG2 Meeting #115 electronic Online, R2-2108014, Aug. 9-27, 2021.
OPPO, "Left issues on Sl-Drx", 3GPP TSG-RAN WG2 #115-e, R2-2108830, E-meeting, Aug. 2021.

* cited by examiner

【FIG. 1】
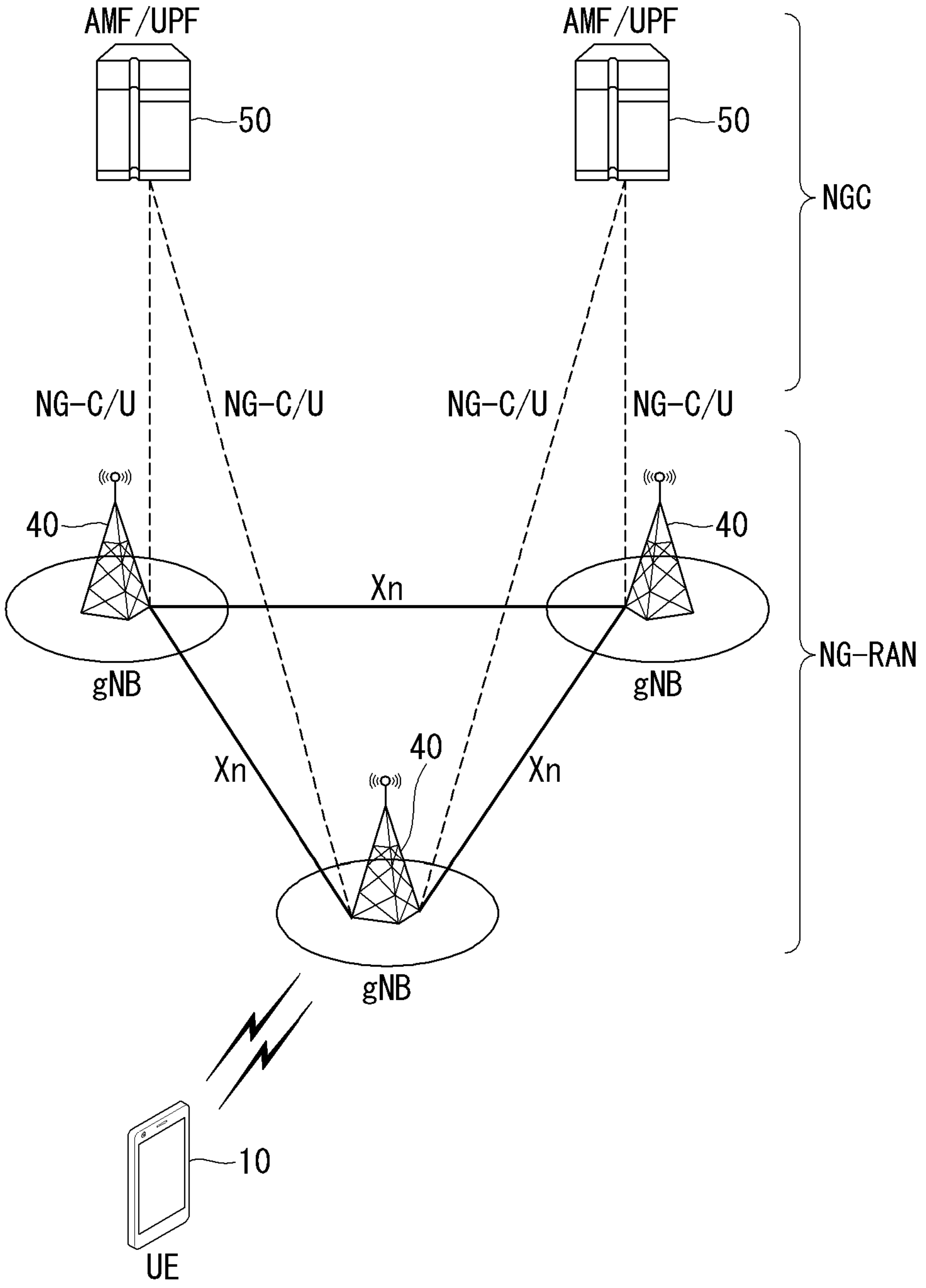

【FIG. 2】
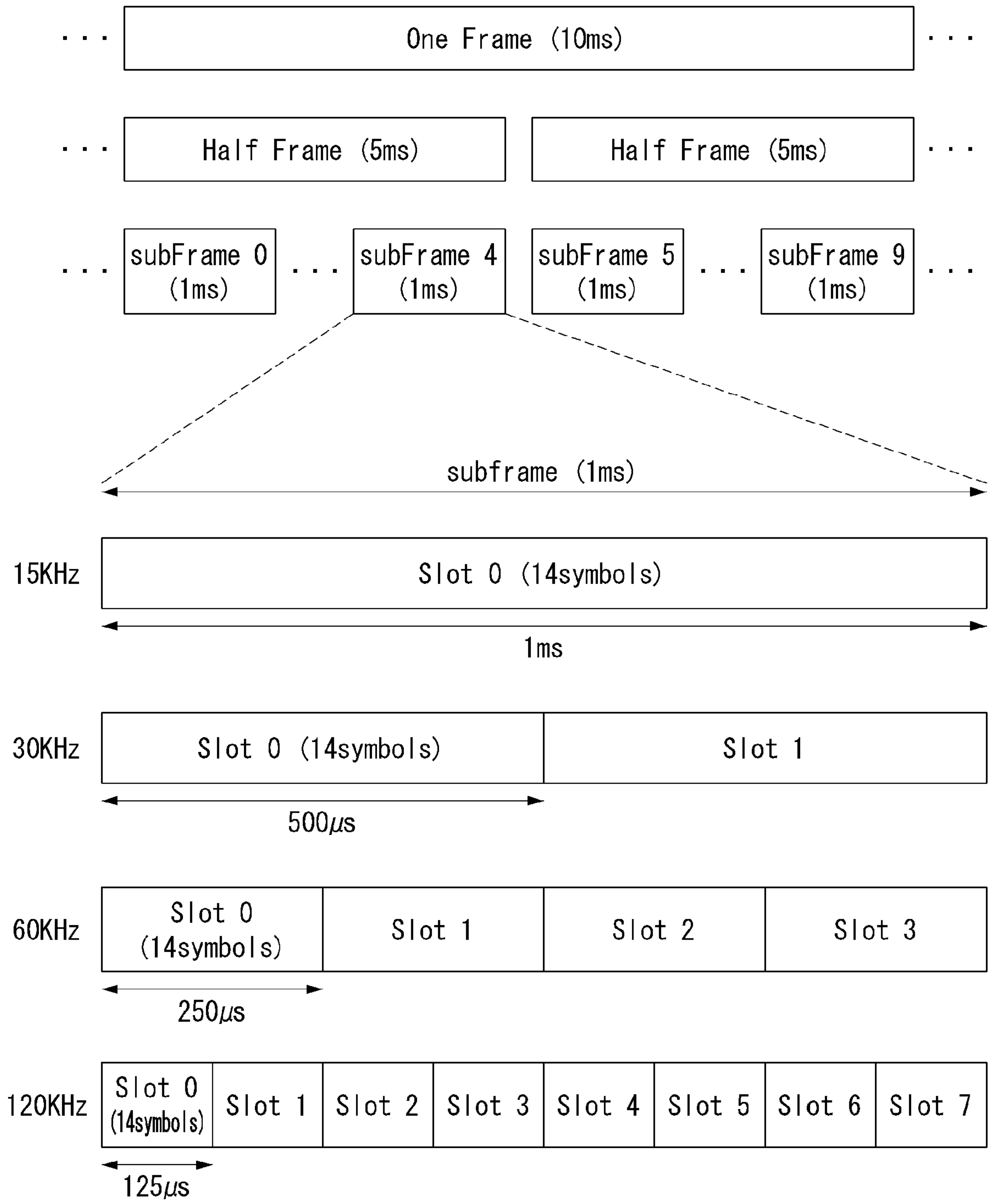

【FIG. 3】
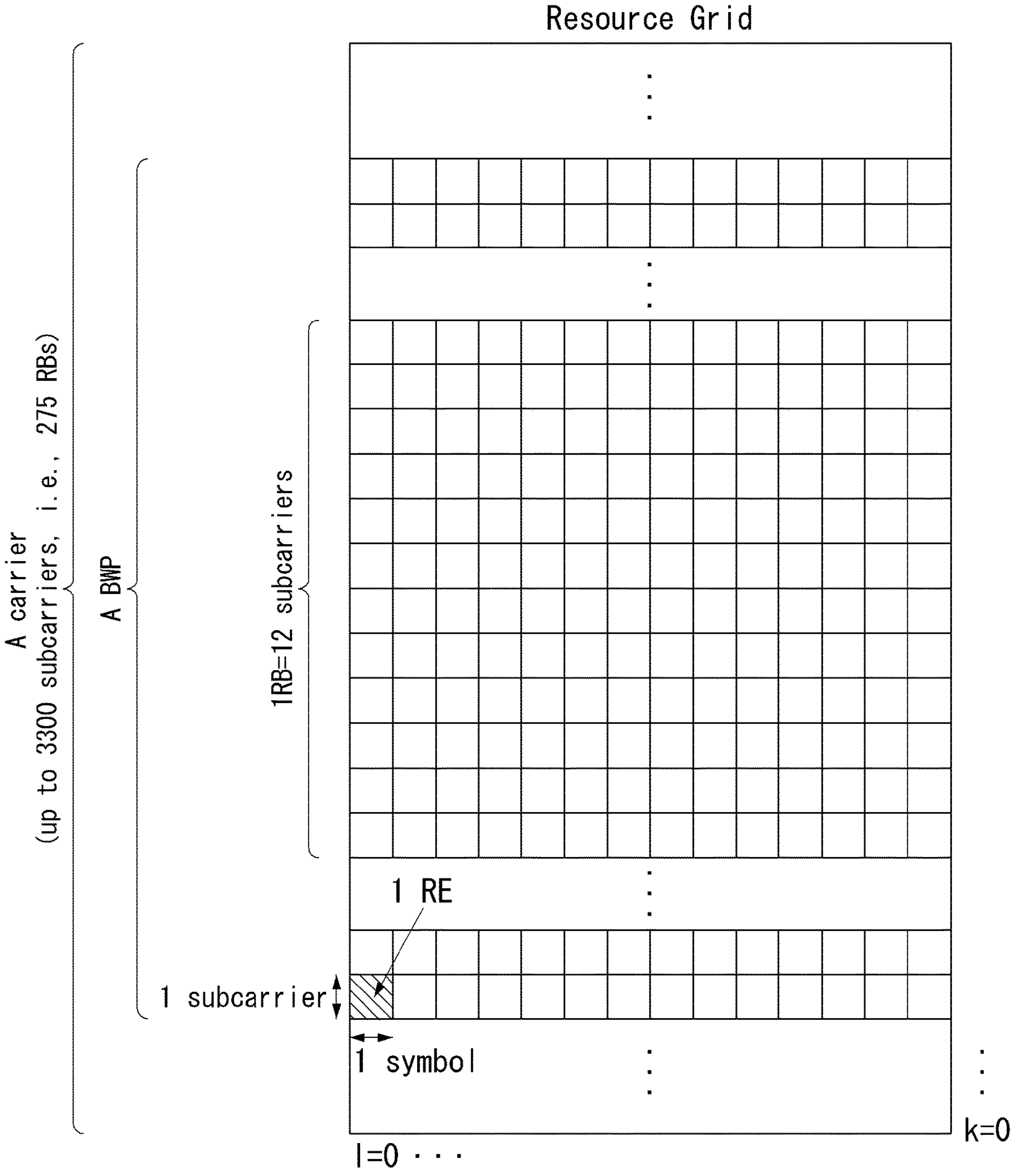

【FIG. 4】
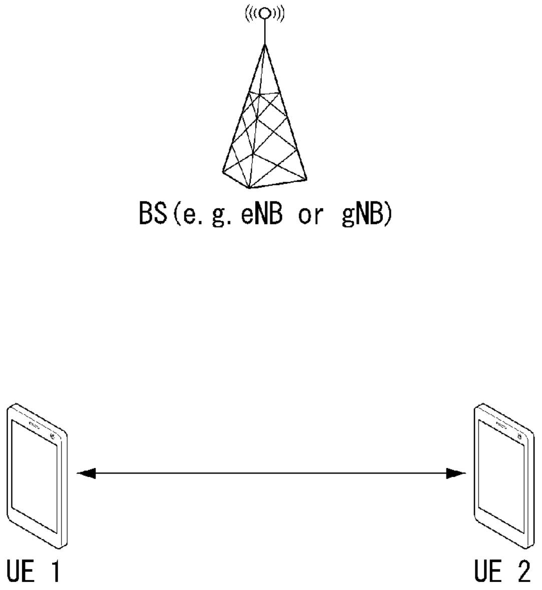

【FIG. 5】
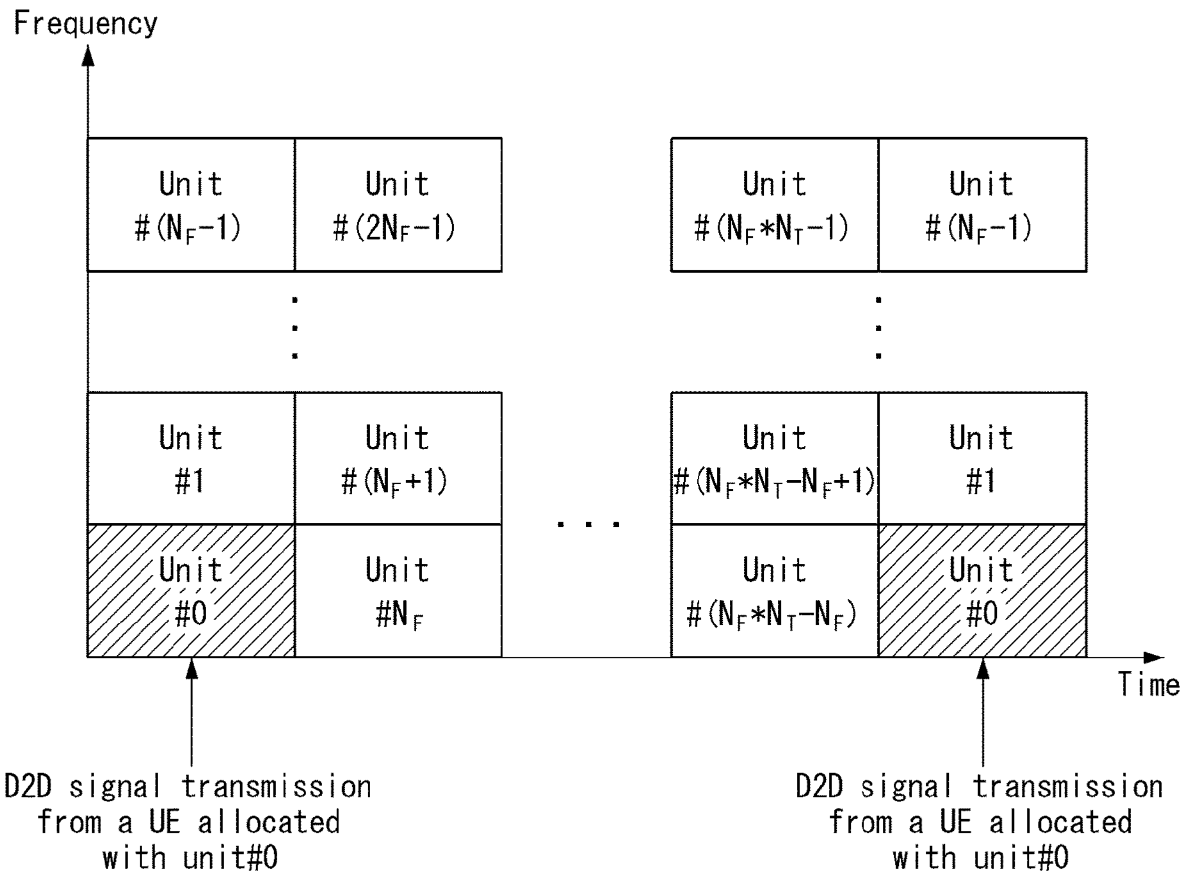

【FIG. 6】
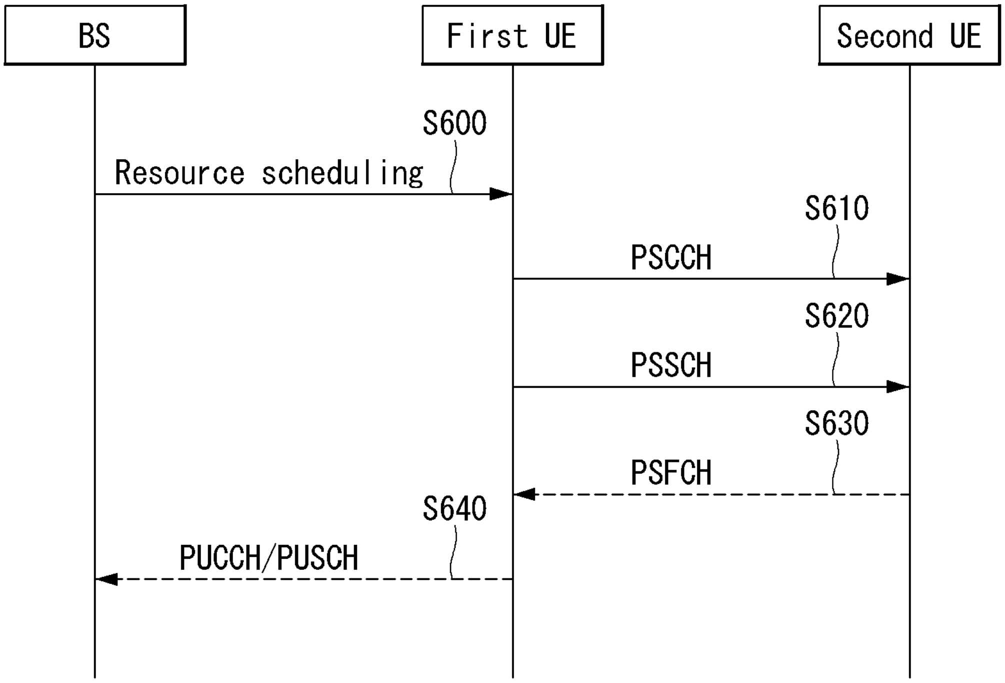
(a)
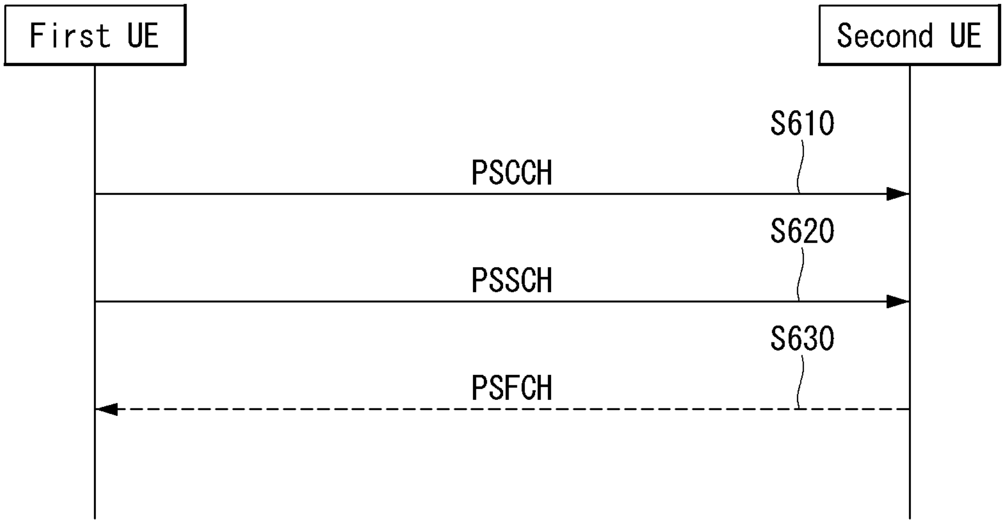
(b)

【FIG. 7】
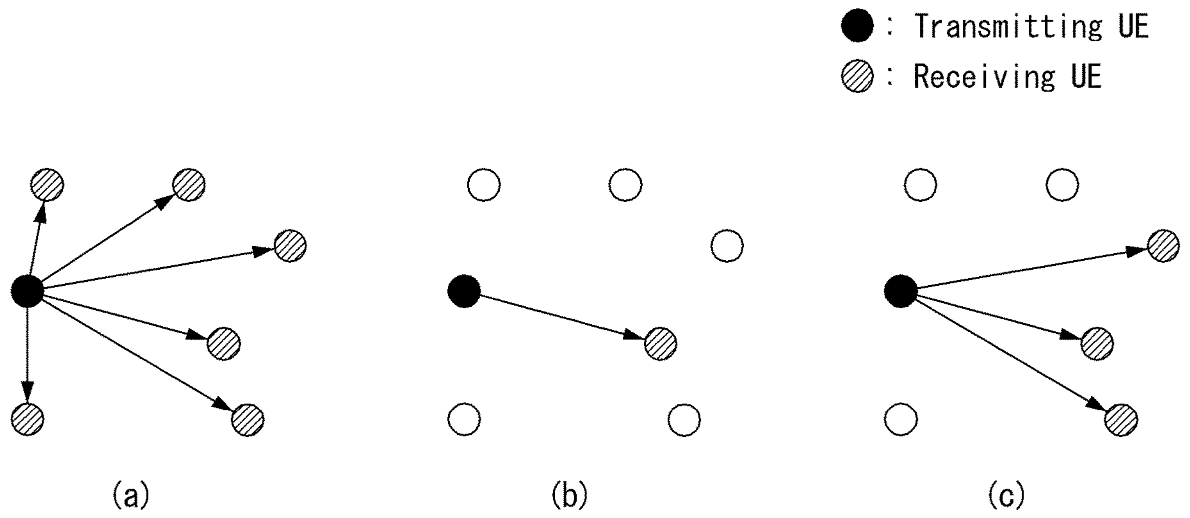
【FIG. 8】
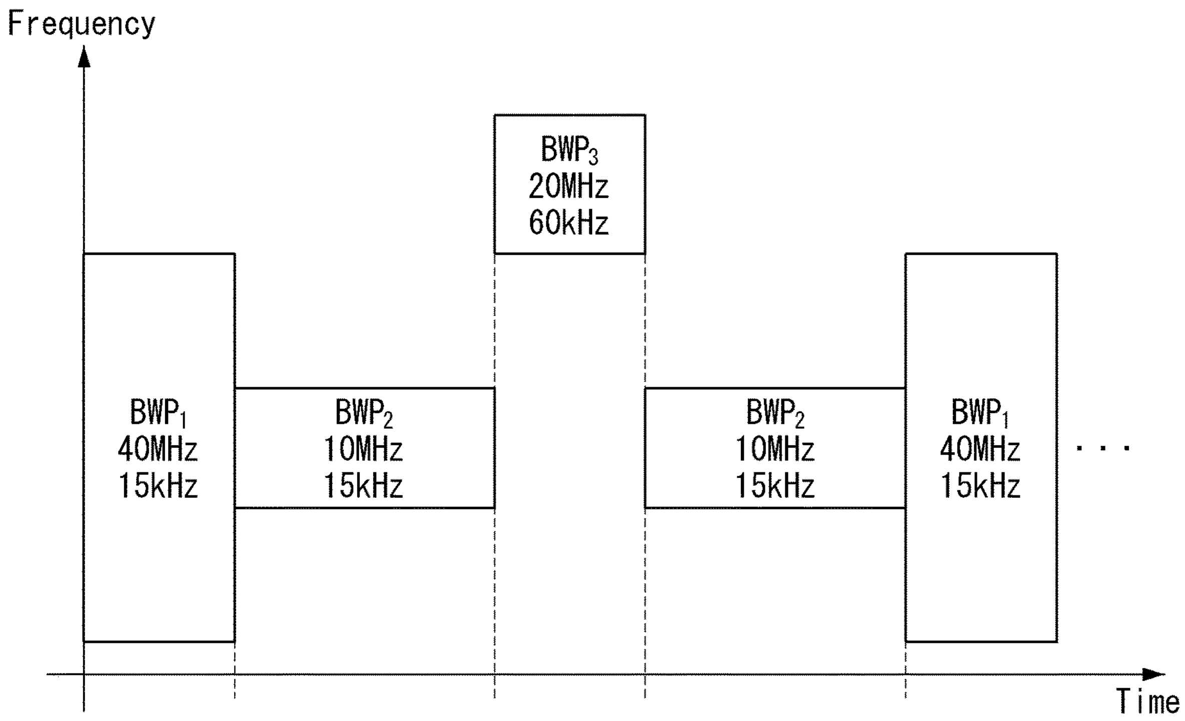

【FIG. 9】
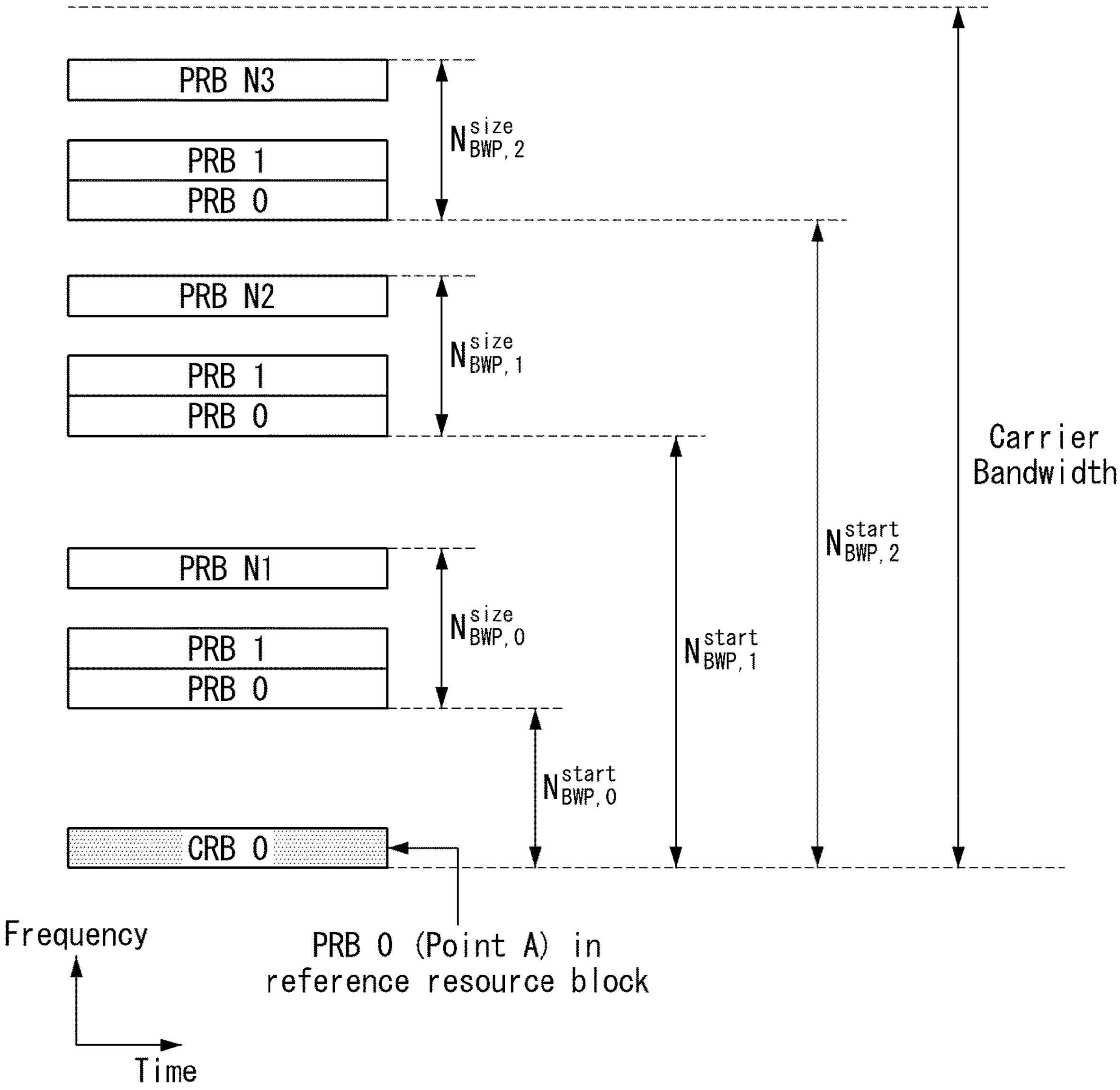

【FIG. 10】
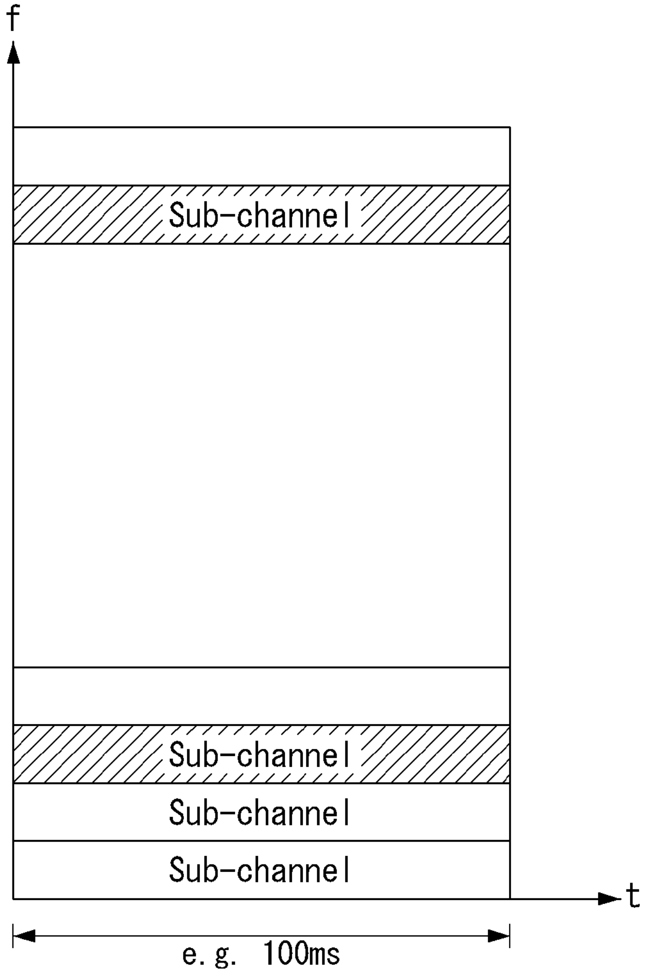

【FIG. 11】
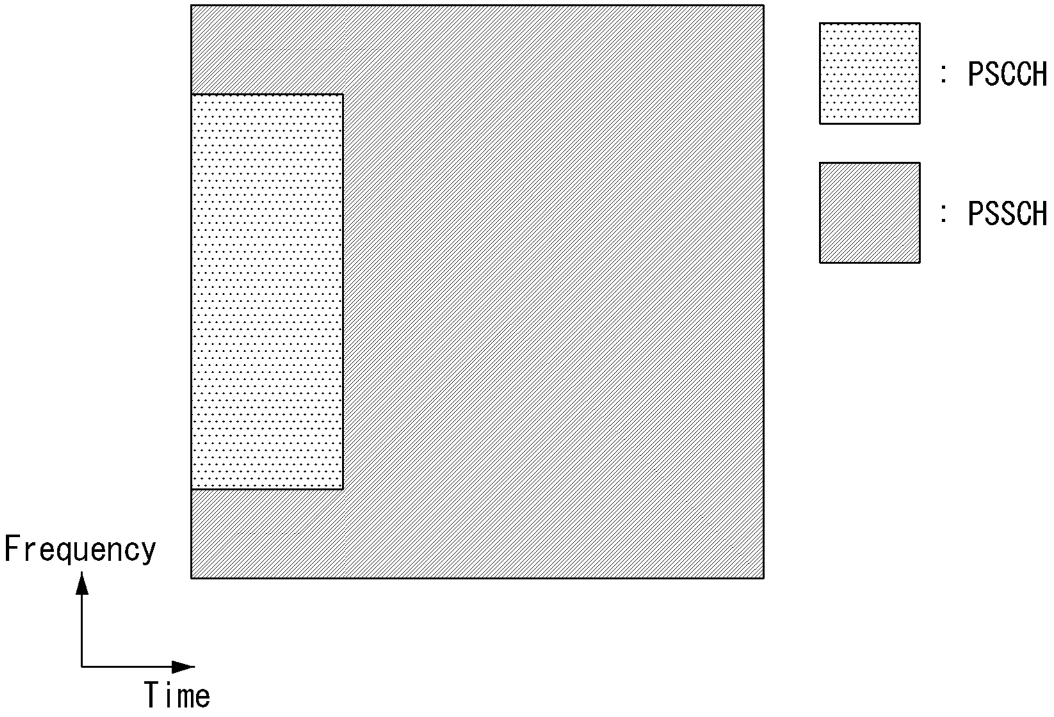

【FIG. 12】
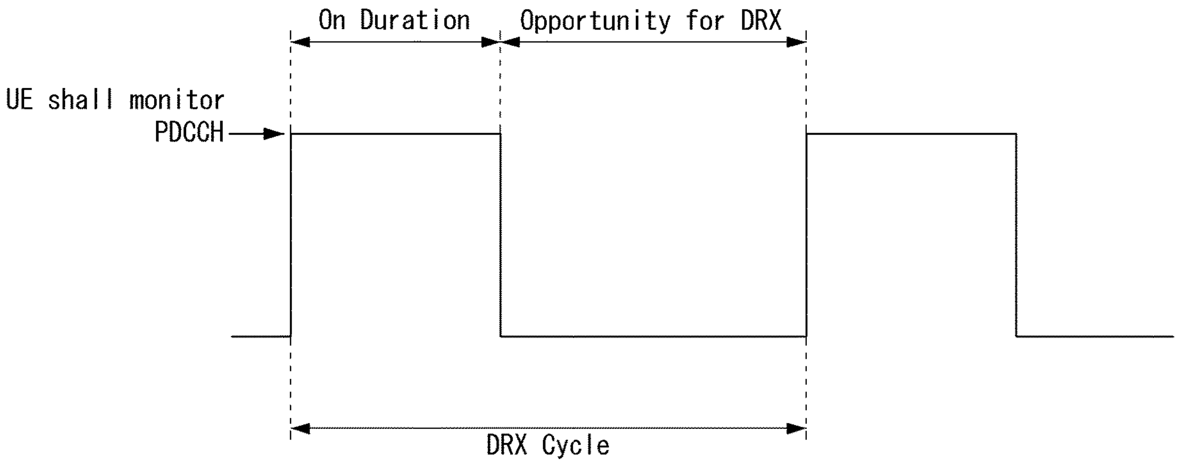
【FIG. 13】
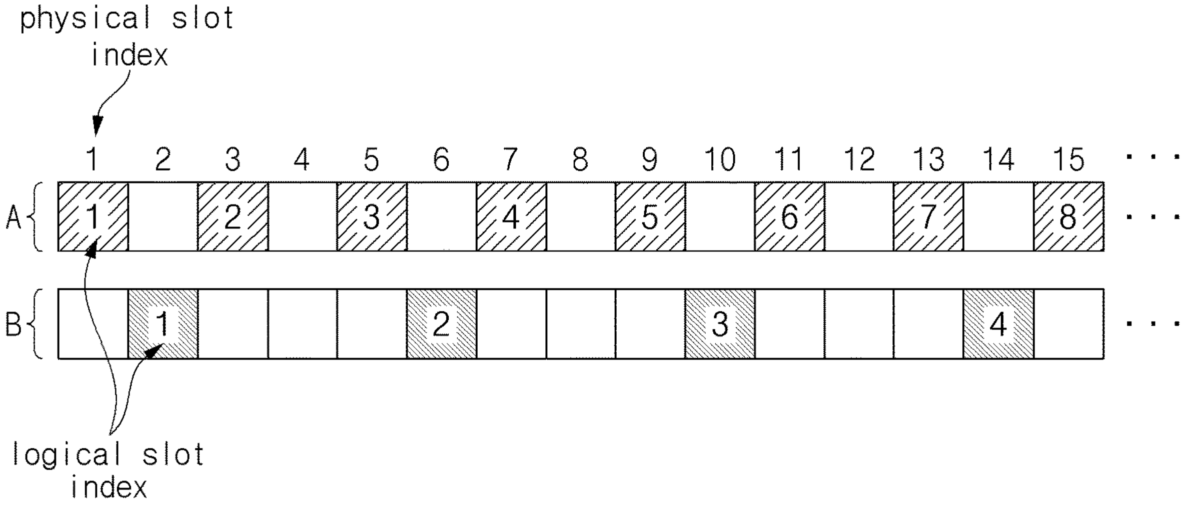

【FIG. 14】
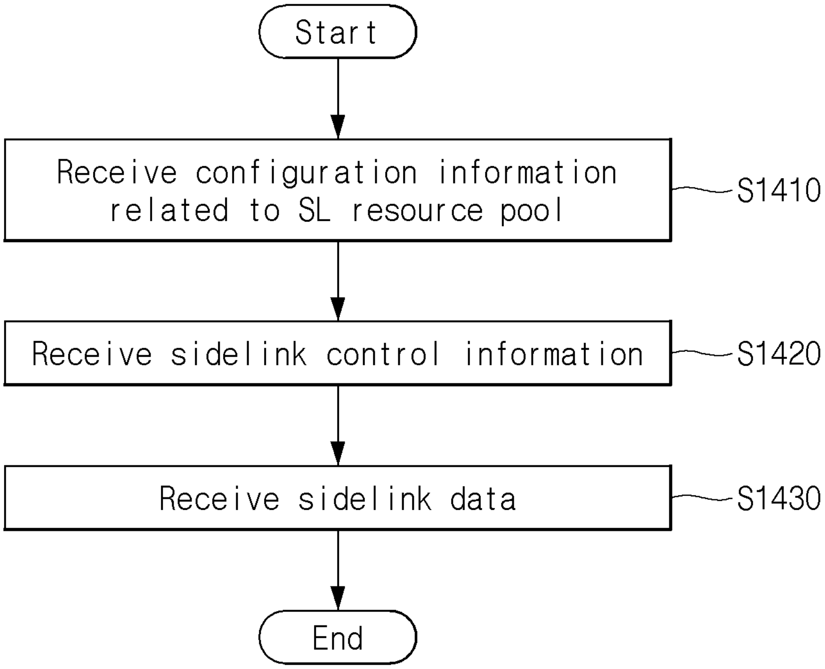

【FIG. 15】
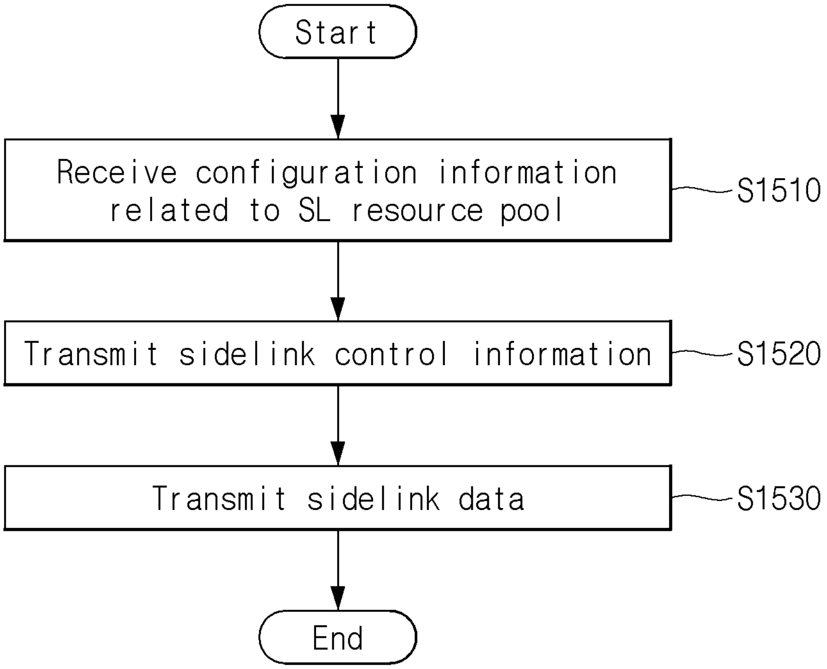

【FIG. 16】
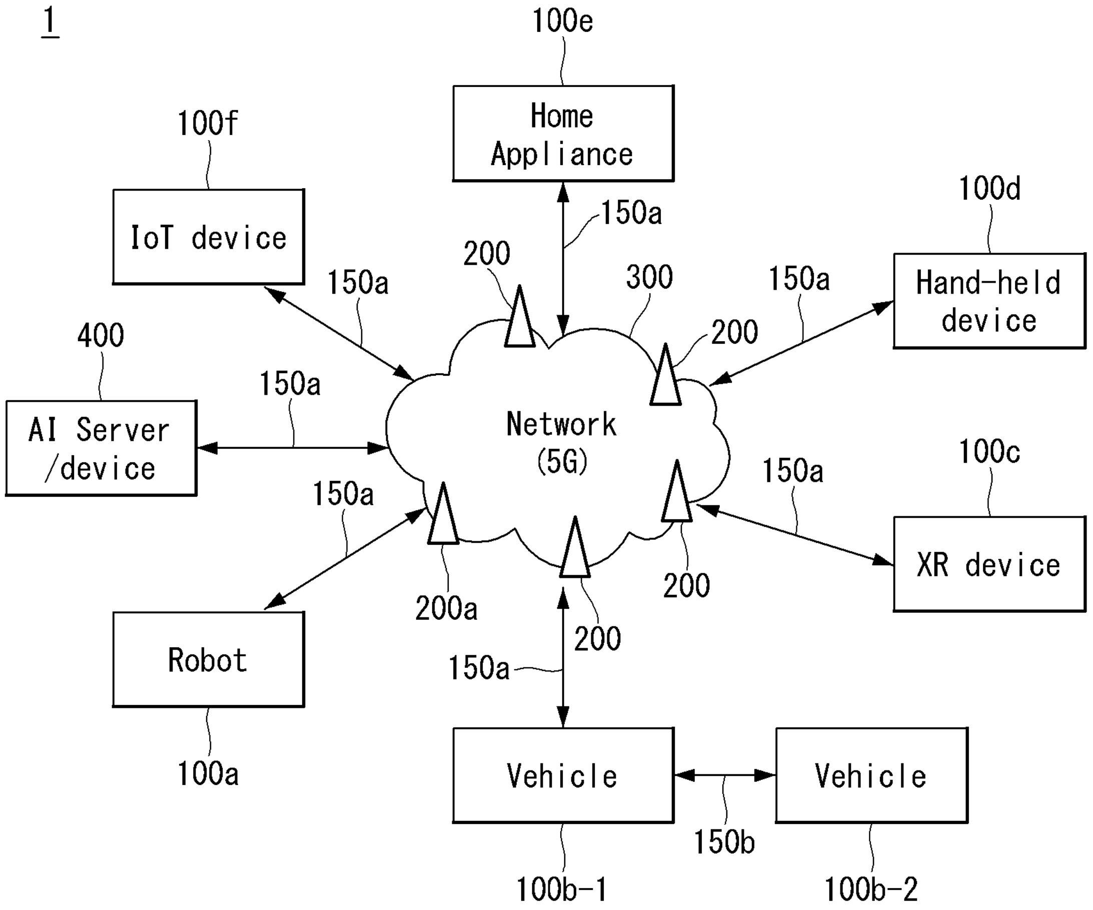

【FIG. 17】
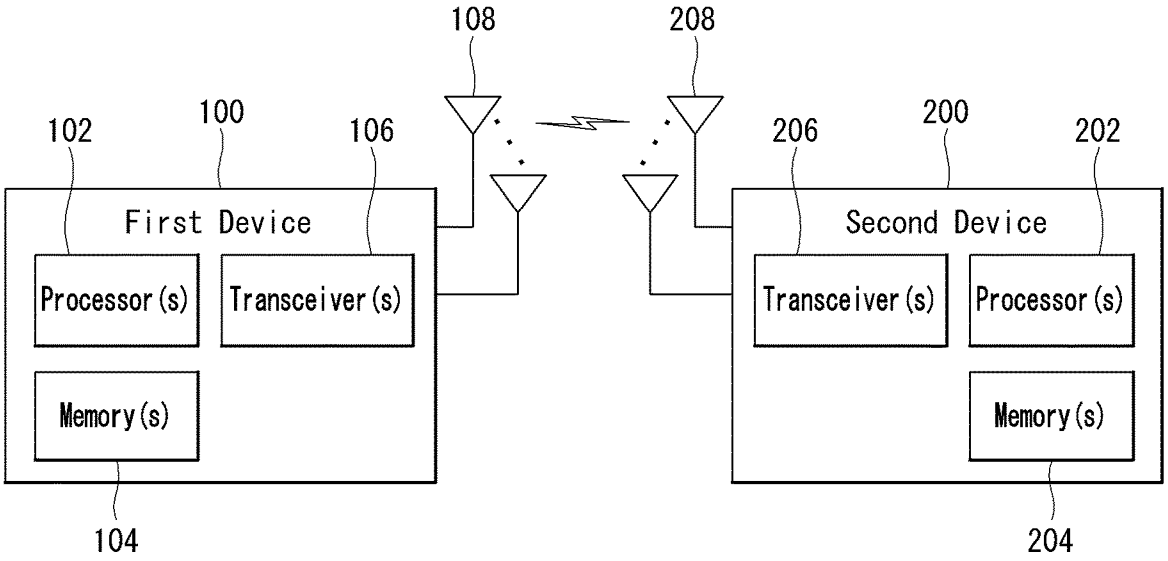
【FIG. 18】
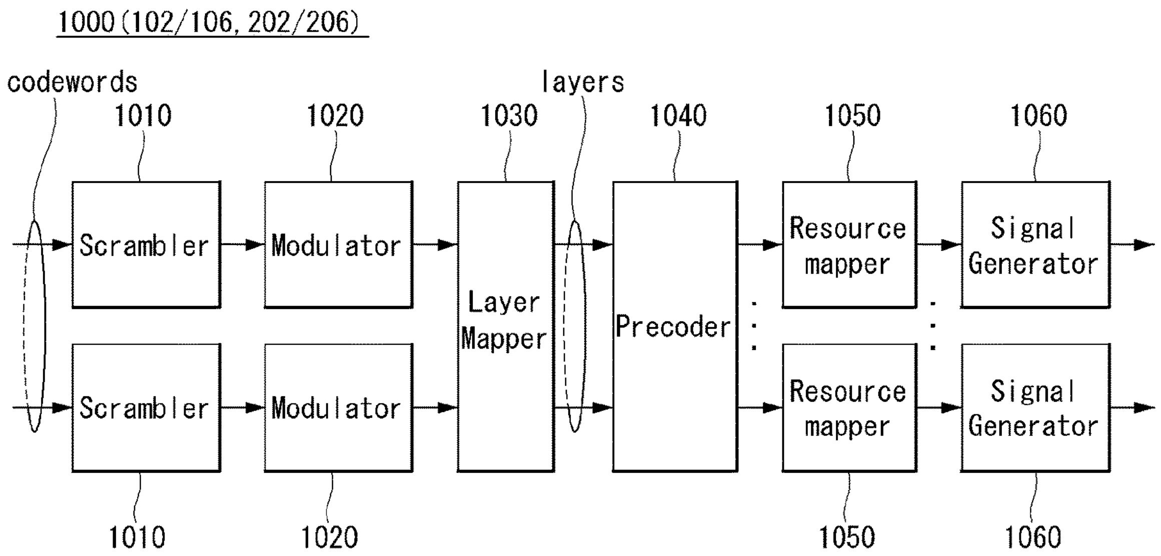

【FIG. 19】
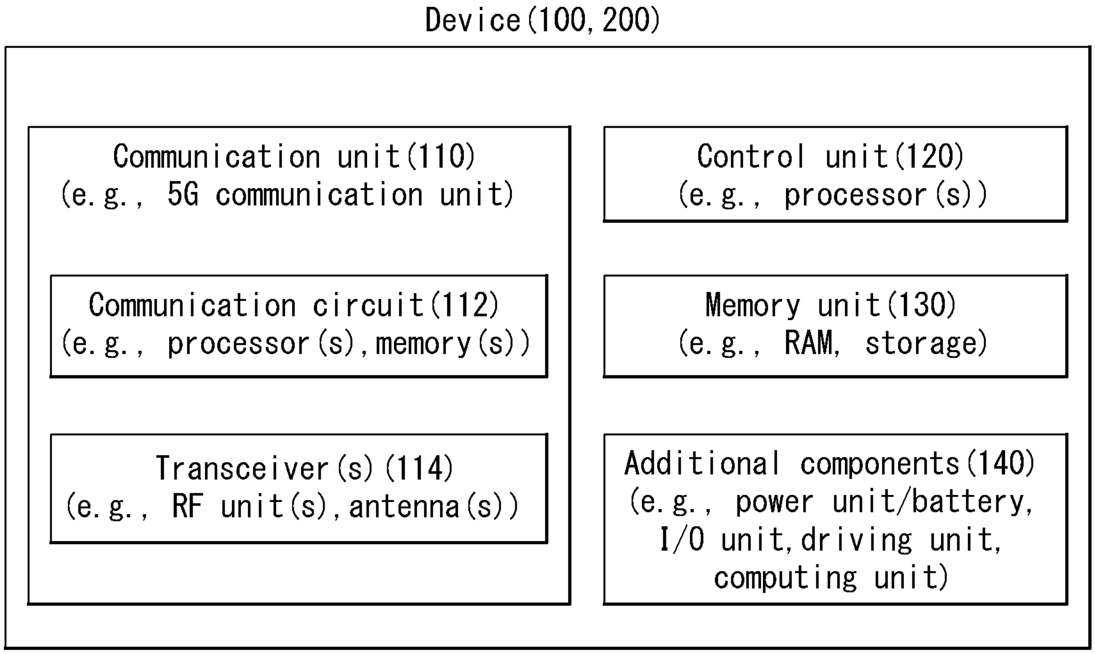

【FIG. 20】
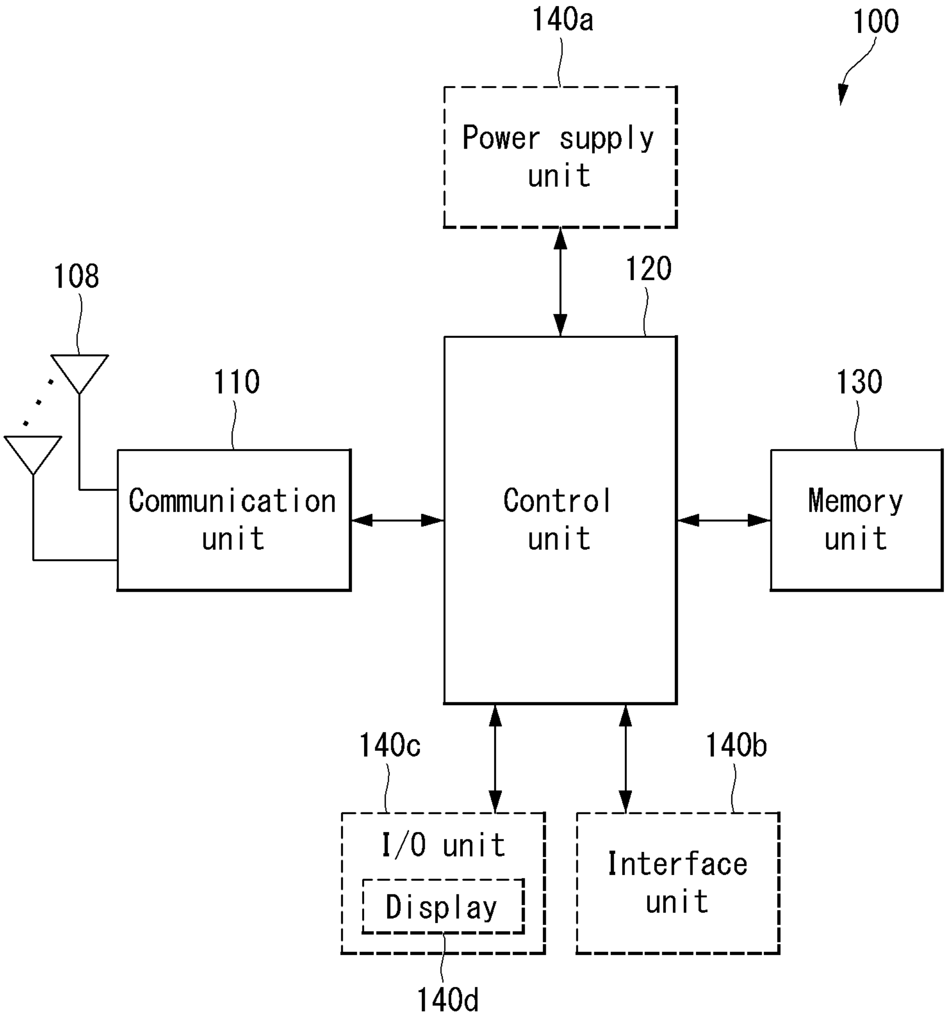

【FIG. 21】
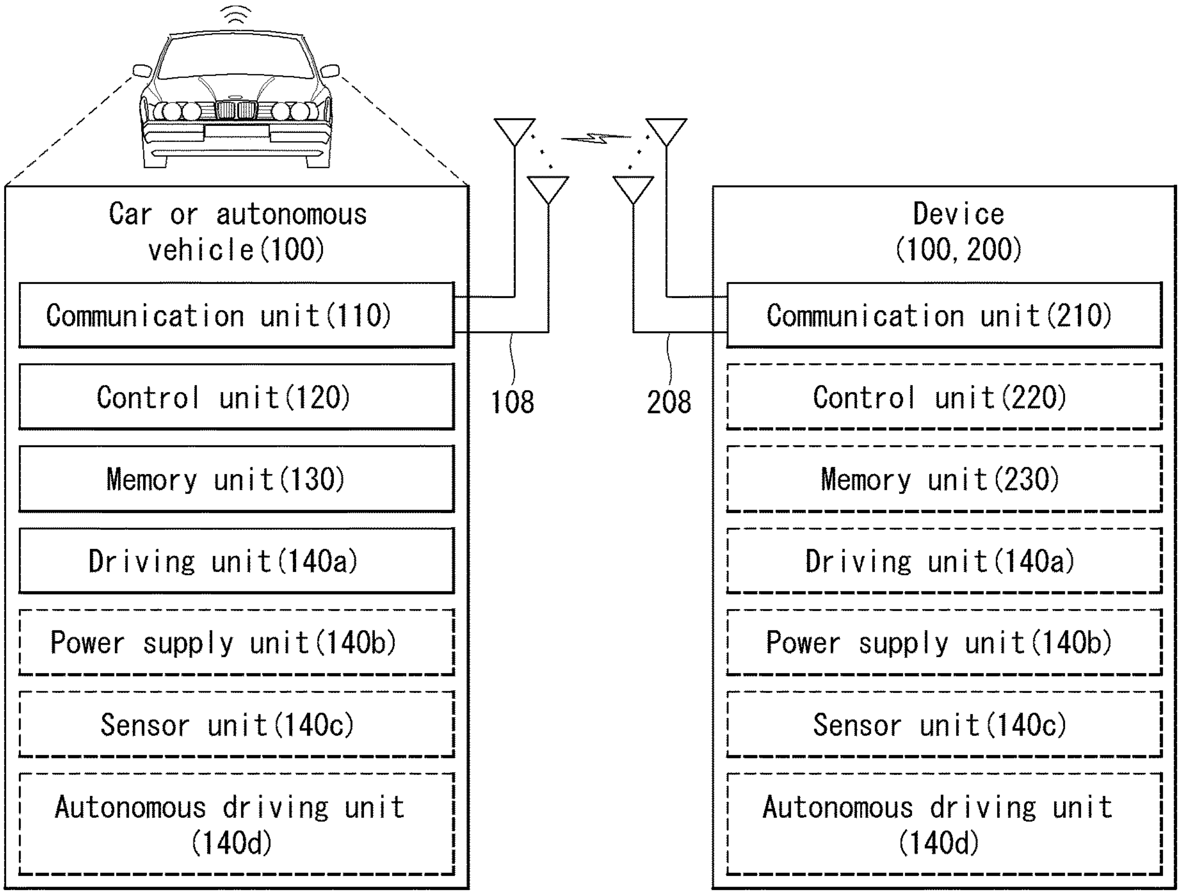

METHOD FOR TRANSMITTING AND RECEIVING SIDELINK DATA AND DEVICE FOR SAME IN WIRELESS COMMUNICATION SYSTEM

CROSS-REFERENCE TO RELATED APPLICATIONS

This application is the National Stage filing under 35 U.S.C. 371 of International Application No. PCT/KR2022/013204, filed on Sep. 2, 2022, which claims the benefit of KR Application No. 10-2021-0117635, filed on Sep. 3, 2021, No. 10-2021-0117822, filed on Sep. 3, 2021, the contents of which are all hereby incorporated by reference herein in their entirety.

TECHNICAL FIELD

The present disclosure relates to a method of transmitting and receiving sidelink data in a wireless communication system and a device therefor.

BACKGROUND

A wireless communication system is a multiple access system that supports communication of multiple users by sharing available system resources (e.g., a bandwidth, transmission power, etc.) among them. Examples of multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

As a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

In a discontinuous reception (DRX) operation, a UE monitors a PDCCH only for active time determined based on DRX configuration (e.g., drx-onDurationTimer, other timers related to active time). The UE does not monitor the PDCCH for inactive time. Therefore, UE power consumption can be reduced based on the DRX operation.

According to a related art, in sidelink control information (SCI) (first stage SCI and second stage SCI) reception for sidelink communication, the DRX operation is not supported. That is, a UE (hereinafter, Rel-16 UE) performing the sidelink communication based on the existing method continues to perform a monitoring operation for receiving the SCI without interruption. Since the operation is inefficient in terms of UE power consumption, sidelink DRX (SL DRX) was introduced in Rel-17. A UE (hereinafter, Rel-17 UE) supporting the SL DRX monitors the SCI (first stage SCI and second stage SCI) only for active time determined based on SL DRX configuration.

SUMMARY

If the SL DRX operation is performed regardless of whether to support the SL DRX, the following problem may occur. SCI (SCI transmitted via a resource pool in which the SL DRX is not supported) transmitted by a UE (e.g., Rel-16 UE) not supporting the SL DRX may be transmitted for inactive time of a UE (e.g., Rel-17 UE) supporting the SL DRX. That is, a signal transmitted based on the existing sidelink configuration (the SL DRX unsupported) may not be received.

An object of the present disclosure is to provide a sidelink communication method for solving the above-described problem.

The technical objects to be achieved by the present disclosure are not limited to those that have been described hereinabove merely by way of example, and other technical objects that are not mentioned can be clearly understood by those skilled in the art, to which the present disclosure pertains, from the following descriptions.

A method of a second user equipment (UE) for receiving sidelink data in a wireless communication system according to an embodiment of the present disclosure comprises receiving, from a base station, configuration information related to a resource pool for sidelink communication, receiving, from a first UE, sidelink control information (SCI), and receiving, from the first UE, the sidelink data based on the SCI.

The SCI is received based on a monitoring related to the SCI. Based on a slot in which the SCI is received, an active time related to sidelink (SL) discontinuous reception (DRX) is determined.

Based on a resource pool including the slot in which the SCI is received, whether to perform an operation related to the SL DRX is determined.

The configuration information may include information for at least one of i) a resource pool in which the SL DRX is supported and/or ii) a resource pool in which the SL DRX is not supported.

Based on the resource pool including the slot in which the SCI is received being the resource pool in which the SL DRX is supported, the operation related to the SL DRX may be performed.

The active time related to the SL DRX may include a time duration in which a pre-configured SL DRX timer is running. The pre-configured SL DRX timer may include at least one of i) an SL DRX Onduration timer, ii) an SL DRX inactivity timer, and/or iii) an SL DRX retransmission timer.

The method may further comprise receiving, from the base station, SL DRX configuration information. The SL DRX configuration information may include information for the pre-configured SL DRX timer.

Based on i) the resource pool including the slot in which the SCI is received being the resource pool in which the SL DRX is supported, and ii) a transmission of the sidelink data scheduled by the SCI being a new sidelink transmission, the SL DRX inactivity timer may be started after the slot in which the SCI is received.

Based on i) the SL DRX HARQ RTT timer related to a retransmission of the sidelink data being started, and ii) a first slot within a time duration, in which the SL DRX HARQ RTT timer is running, belonging to the resource pool in which the SL DRX is not supported, the monitoring related to the SCI may be performed in the first slot.

Based on i) the SL DRX HARQ RTT timer related to a retransmission of the sidelink data being started, and ii) a second slot within a time duration, in which the SL DRX HARQ RTT timer is running, belonging to the resource pool in which the SL DRX is supported, a monitoring related to the SCI for the data reception may be skipped in the second slot.

Based on the resource pool including the slot in which the SCI is received being the resource pool in which the SL DRX is not supported, the operation related to the SL DRX may not be performed.

A second user equipment (UE) receiving sidelink data in a wireless communication system according to another embodiment of the present disclosure comprises one or more transceivers, one or more processors configured to control the one or more transceivers, and one or more memories operably connected to the one or more processors.

The one or more memories are configured to store instructions performing operations based on being executed by the one or more processors.

The operations comprise receiving, from a base station, configuration information related to a resource pool for sidelink communication, receiving, from a first UE, sidelink control information (SCI), and receiving, from the first UE, the sidelink data based on the SCI.

The SCI is received based on a monitoring related to the SCI. Based on a slot in which the SCI is received, an active time related to sidelink (SL) discontinuous reception (DRX) is determined.

Based on a resource pool including the slot in which the SCI is received, whether to perform an operation related to the SL DRX is determined.

A device controlling a second user equipment (UE) to receive sidelink data in a wireless communication system according to another embodiment of the present disclosure comprises one or more processors, and one or more memories operably connected to the one or more processors.

The one or more memories are configured to store instructions performing operations based on being executed by the one or more processors.

The operations comprise receiving, from a base station, configuration information related to a resource pool for sidelink communication, receiving, from a first UE, sidelink control information (SCI), and receiving, from the first UE, the sidelink data based on the SCI.

The SCI is received based on a monitoring related to the SCI. Based on a slot in which the SCI is received, an active time related to sidelink (SL) discontinuous reception (DRX) is determined.

Based on a resource pool including the slot in which the SCI is received, whether to perform an operation related to the SL DRX is determined.

One or more non-transitory computer readable mediums according to another embodiment of the present disclosure store one or more instructions.

The one or more instructions perform operations based on being executed by one or more processors.

The operations comprise receiving, from a base station, configuration information related to a resource pool for sidelink communication, receiving, from a first UE, sidelink control information (SCI), and receiving, from the first UE, sidelink data based on the SCI.

The SCI is received based on a monitoring related to the SCI. Based on a slot in which the SCI is received, an active time related to sidelink (SL) discontinuous reception (DRX) is determined.

Based on a resource pool including the slot in which the SCI is received, whether to perform an operation related to the SL DRX is determined.

A method of a first user equipment (UE) for transmitting sidelink data in a wireless communication system according to another embodiment of the present disclosure comprises receiving, from a base station, configuration information related to a resource pool for sidelink communication, transmitting, to a second UE, sidelink control information (SCI), and transmitting, to the second UE, the sidelink data based on the SCI.

The SCI is transmitted in a time duration in which a monitoring related to the SCI is performed. Based on a slot in which the SCI is transmitted, an active time related to sidelink (SL) discontinuous reception (DRX) of the second UE is determined.

Based on a resource pool including the slot in which the SCI is transmitted, whether to perform an operation related to the SL DRX of the second UE is determined.

A first user equipment (UE) transmitting sidelink data in a wireless communication system according to another embodiment of the present disclosure comprises one or more transceivers, one or more processors configured to control the one or more transceivers, and one or more memories operably connected to the one or more processors.

The one or more memories are configured to store instructions performing operations based on being executed by the one or more processors.

The operations comprise receiving, from a base station, configuration information related to a resource pool for sidelink communication, transmitting, to a second UE, sidelink control information (SCI), and transmitting, to the second UE, the sidelink data based on the SCI.

The SCI is transmitted in a time duration in which a monitoring related to the SCI is performed. Based on a slot in which the SCI is transmitted, an active time related to sidelink (SL) discontinuous reception (DRX) of the second UE is determined.

Based on a resource pool including the slot in which the SCI is transmitted, whether to perform an operation related to the SL DRX of the second UE is determined.

According to an embodiment of the present disclosure, the SL DRX operation is performed based on the resource pool. The SL DRX operation is performed only for a resource pool (Rel-17 based resource pool) in which the SL DRX is supported, and is not performed for a resource pool (Rel-16 based resource pool) in which the SL DRX is not supported.

1) Since SCI is received for a resource pool, in which the SL DRX is supported, based on the SL DRX operation, UE consumption power can be reduced compared to the existing sidelink communication scheme. In addition, 2) Since SCI is received for a resource pool, in which the SL DRX is not supported, in the same method as the existing method (i.e., SCI is received without interruption of monitoring), reliability of sidelink communication between a UE supporting the SL DRX and an existing UE not supporting the SL DRX can be improved.

Effects that could be achieved with the present disclosure are not limited to those that have been described hereinabove merely by way of example, and other effects and advantages of the present disclosure will be more clearly understood from the following description by a person skilled in the art to which the present disclosure pertains.

BRIEF DESCRIPTION OF THE DRAWINGS

The accompanying drawings, which are included to provide a further understanding of the present disclosure and constitute a part of the detailed description, illustrate embodiments of the present disclosure and together with the description serve to explain the principle of the present disclosure.

FIG. 1 shows a structure of an NR system, based on an embodiment of the present disclosure.

FIG. 2 shows a structure of a radio frame of an NR, based on an embodiment of the present disclosure.

FIG. 3 shows a structure of a slot of an NR frame, based on an embodiment of the present disclosure.

FIG. 4 shows a UE performing V2X or SL communication based on an embodiment of the present disclosure.

FIG. 5 shows a resource unit for V2X or SL communication based on an embodiment of the present disclosure.

FIG. 6 shows a procedure of performing V2X or SL communication by a UE based on a transmission mode, based on an embodiment of the present disclosure.

FIG. 7 shows three cast type based on an embodiment of the present disclosure.

FIG. 8 shows a plurality of BWPs based on an embodiment of the present disclosure.

FIG. 9 shows a BWP based on an embodiment of the present disclosure.

FIG. 10 shows a resource unit for CBR measurement based on an embodiment of the present disclosure.

FIG. 11 illustrates a resource pool related to CBR measurement.

FIG. 12 illustrates an example of a DRX cycle to which a method described in the present disclosure is applicable.

FIG. 13 illustrates an example of a resource pool for sidelink communication according to an embodiment of the present disclosure.

FIG. 14 is a flowchart illustrating a method for a second UE to receive sidelink data in a wireless communication system according to an embodiment of the present disclosure.

FIG. 15 is a flowchart illustrating a method for a first UE to transmit sidelink data in a wireless communication system according to another embodiment of the present disclosure.

FIG. 16 shows a communication system 1 based on an embodiment of the present disclosure.

FIG. 17 shows wireless devices based on an embodiment of the present disclosure.

FIG. 18 shows a signal process circuit for a transmission signal based on an embodiment of the present disclosure.

FIG. 19 shows another example of a wireless device based on an embodiment of the present disclosure.

FIG. 20 shows a hand-held device based on an embodiment of the present disclosure FIG. 21 shows a vehicle or an autonomous vehicle based on an embodiment of the present disclosure.

DETAILED DESCRIPTION

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

In the following description, 'when, if, or in case of' may be replaced with 'based on'.

A technical feature described individually in one figure in the present disclosure may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE. 5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

For terms and techniques not specifically described among terms and techniques used in the present disclosure, reference may be made to a wireless communication standard document published before the present disclosure is filed. For example, the following document may be referred to.

| 3GPP LTE | 3GPP NR (e.g. 5G) |
|---|---|
| 3GPP TS 36.211: Physical channels and modulation | 3GPP TS 38.211: Physical channels and modulation |
| 3GPP TS 36.212: Multiplexing and channel coding | 3GPP TS 38.212: Multiplexing and channel coding |
| 3GPP TS 36.213: Physical layer procedures | 3GPP TS 38.213: Physical layer procedures for control |
| 3GPP TS 36.214: Physical layer; Measurements | 3GPP TS 38.214: Physical layer procedures for data |
| 3GPP TS 36.300: Overall description | 3GPP TS 38.215: Physical layer measurements |
| 3GPP TS 36.304: User Equipment (UE) procedures in idle mode | 3GPP TS 38.300: Overall description |
| 3GPP TS 36.314: Layer 2 - Measurements | 3GPP TS 38.304: User Equipment (UE) procedures in idle mode and in RRC inactive state |
| 3GPP TS 36.321: Medium Access Control (MAC) protocol | 3GPP TS 38.321: Medium Access Control (MAC) protocol |
| 3GPP TS 36.322: Radio Link Control (RLC) protocol | 3GPP TS 38.322: Radio Link Control (RLC) protocol |
| 3GPP TS 36.323: Packet Data Convergence Protocol (PDCP) | 3GPP TS 38.323: Packet Data Convergence Protocol (PDCP) |
| 3GPP TS 36.331: Radio Resource Control (RRC) protocol | 3GPP TS 38.331: Radio Resource Control (RRC) protocol |
| | 3GPP TS 37.324: Service Data Adaptation Protocol (SDAP) |
| | 3GPP TS 37.340: Multi-connectivity; Overall description |

FIG. 1 shows a structure of an NR system, based on an embodiment of the present disclosure.

Referring to FIG. 1, a Next Generation-Radio Access Network (NG-RAN) may include a next generation-Node B (gNB) and/or eNB providing a user plane and control plane protocol termination to a user. FIG. 1 shows a case where the NG-RAN includes only the gNB. The gNB and the eNB are connected to one another via Xn interface. The gNB and the eNB are connected to one another via 5th Generation (5G) Core Network (5GC) and NG interface. More specifically, the gNB and the eNB are connected to an access and mobility management function (AMF) via NG-C interface, and the gNB and the eNB are connected to a user plane function (UPF) via NG-U interface.

FIG. 2 shows a structure of a radio frame of an NR, based on an embodiment of the present disclosure.

Referring to FIG. 2, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM (A) symbols based on a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM (A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range Designation | Corresponding Frequency Range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range Designation | Corresponding Frequency Range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

FIG. 3 shows a structure of a slot of an NR frame, based on an embodiment of the present disclosure.

Referring to FIG. 3, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

A radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Sidelink Synchronization Signal (SLSS) and Synchronization Information

The SLSS may be an SL-specific sequence and include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and/or for synchronization acquisition. For example, the UE may use the S-PSS and the S-SSS for acquisition of fine synchronization and/or for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-) configured sidelink (SL) BWP. For example, the S-SSB may have a bandwidth of 11 resource blocks (RBs). For example, the PSBCH may exist across 11 RBs. In addition, a frequency position of the S-SSB may be (pre-) configured. Accordingly, the UE does not have to perform hypothesis detection at frequency to discover the S-SSB in the carrier.

A plurality of numerologies having different SCSs and/or CP lengths may be supported in an NR SL system. In this case, a length of a time resource used by a transmitting UE to transmit the S-SSB may be decreased along with an increase in the SCS. Accordingly, coverage of the S-SSB may be decreased. Therefore, in order to ensure the coverage of the S-SSB, the transmitting UE may transmit one or more S-SSBs to a receiving UE within one S-SSB transmission duration based on the SCS. For example, the number of S-SSBs transmitted by the transmitting UE to the receiving UE within one S-SSB transmission duration may be pre-configured or configured to the transmitting UE. For example, an S-SSB transmission duration may be 160 ms. For example, the S-SSB transmission duration of 160 ms may be supported for all SCSs.

FIG. 4 shows a UE performing V2X or SL communication based on an embodiment of the present disclosure.

Referring to FIG. 4, in V2X or SL communication, the term 'UE' may generally imply a UE of a user. However, if a network equipment such as a BS transmits/receives a signal based on a communication scheme between UEs, the BS may also be regarded as a sort of the UE. For example, a UE 1 may be a first device 100, and a UE 2 may be a second device 200.

For example, the UE 1 may select a resource unit corresponding to a specific resource in a resource pool which implies a set of series of resources. In addition, the UE 1 may transmit an SL signal by using the resource unit. For example, the UE 2 which is a receiving UE may be allocated with a resource pool in which the UE 1 is capable of transmitting a signal, and may detect a signal of the UE 1 in the resource pool.

Herein, if the UE 1 is within a coverage of the BS, the BS may inform the UE 1 of the resource pool. Otherwise, if the UE 1 is out of the coverage of the BS, another UE may inform the UE 1 of the resource pool, or the UE 1 may use a pre-configured resource pool.

In general, the resource pool may be configured based on a plurality of resource units, and each UE may select at least one resource unit for SL signal transmission.

FIG. 5 shows a resource unit for V2X or SL communication based on an embodiment of the present disclosure.

Referring to FIG. 5, all frequency resources of a resource pool may be divided into NF resources, and all time resources of the resource pool may be divided into NT resources. Therefore, NF*NT resource units may be defined in the resource pool. FIG. 5 may show an example of a case where a corresponding resource pool is repeated with a duration of NT subframes.

As shown in FIG. 5, one resource unit (e.g., Unit #0) may be periodically repeated. Alternatively, to obtain a diversity effect in a time or frequency domain, an index of a physical resource unit to which one logical resource unit is mapped may change to a pre-determined pattern over time. In a structure of such a resource unit, the resource pool may imply a set of resource units that can be used in transmission by a UE intending to transmit an SL signal.

The resource pool may be subdivided into several types. For example, based on content of an SL signal transmitted in each resource pool, the resource pool may be classified as follows.

(1) Scheduling assignment (SA) may be a signal including information related to a location of a resource used for transmission of an SL data channel by a transmitting UE, a modulation and coding scheme (MCS) or multiple input multiple output (MIMO) transmission scheme required for demodulation of other data channels, timing advance (TA), or the like. The SA can be transmitted by being multiplexed together with SL data on the same resource unit. In this case, an SA resource pool may imply a resource pool in which SA is transmitted by being multiplexed with SL data. The SA may also be referred to as an SL control channel.

(2) An SL data channel (physical sidelink shared channel (PSSCH)) may be a resource pool used by the transmitting UE to transmit user data. If SA is transmitted by being multiplexed together with SL data on the same resource unit, only an SL data channel of a type except for SA information may be transmitted in the resource pool for the SL data channel. In other words, resource elements (REs) used to transmit SA information on an individual resource unit in the SA resource pool may be used to transmit SL data still in the resource pool of the SL data channel. For example, the transmitting UE may transmit the PSSCH by mapping it to consecutive PRBs.

(3) A discovery channel may be a resource pool for transmitting, by the transmitting UE, information related to an ID thereof, or the like. Accordingly, the transmitting UE may allow an adjacent UE to discover the transmitting UE itself.

Even if the aforementioned SL signals have the same content, different resource pools may be used based on a transmission/reception attribute of the SL signals. For example, even the same SL data channel or discovery message may be classified again into different resource pools based on a scheme of determining SL signal transmission timing (e.g., whether it is transmitted at a reception time of a synchronization reference signal or transmitted by applying a specific timing advance at the reception time), a resource allocation scheme (e.g., whether a BS designates a transmission resource of an individual signal to an individual transmitting UE or whether the individual transmitting UE autonomously selects an individual signal transmission resource in a resource pool), a signal format (e.g., the number of symbols occupied by each SL signal or the number of subframes used in transmission of one SL signal), signal strength from the BS, transmit power strength of an SL UE, or the like.

Resource Allocation in SL

FIG. 6 shows a procedure of performing V2X or SL communication by a UE based on a transmission mode, based on an embodiment of the present disclosure.

The embodiment of FIG. 6 may be combined with various embodiments of the present disclosure. In various embodiments of the present disclosure, the transmission mode may be referred to as a mode or a resource allocation mode. Hereinafter, for convenience of explanation, in LTE, the transmission mode may be referred to as an LTE transmission mode. In NR, the transmission mode may be referred to as an NR resource allocation mode.

For example, (a) of FIG. 6 shows a UE operation related to an LTE transmission mode 1 or an LTE transmission mode 3. Alternatively, for example, (a) of FIG. 6 shows a UE operation related to an NR resource allocation mode 1. For example, the LTE transmission mode 1 may be applied to general SL communication, and the LTE transmission mode 3 may be applied to V2X communication.

For example, (b) of FIG. 6 shows a UE operation related to an LTE transmission mode 2 or an LTE transmission mode 4. Alternatively, for example, (b) of FIG. 6 shows a UE operation related to an NR resource allocation mode 2.

Referring to (a) of FIG. 6, in the LTE transmission mode 1, the LTE transmission mode 3, or the NR resource allocation mode 1, a base station may schedule SL resource(s) to be used by a UE for SL transmission. For example, in step S600, a base station may transmit information related to SL resource(s) and/or information related to UL resource(s) to a first UE. For example, the UL resource(s) may include PUCCH resource(s) and/or PUSCH resource(s). For example, the UL resource(s) may be resource(s) for reporting SL HARQ feedback to the base station.

For example, the first UE may receive information related to dynamic grant (DG) resource(s) and/or information related to configured grant (CG) resource(s) from the base station. For example, the CG resource(s) may include CG type 1 resource(s) or CG type 2 resource(s). In the present disclosure, the DG resource(s) may be resource(s) configured/allocated by the base station to the first UE through a downlink control information (DCI). In the present disclosure, the CG resource(s) may be (periodic) resource(s) configured/allocated by the base station to the first UE through a DCI and/or an RRC message. For example, in the case of the CG type 1 resource(s), the base station may transmit an RRC message including information related to CG resource(s) to the first UE. For example, in the case of the CG type 2 resource(s), the base station may transmit an RRC message including information related to CG resource(s) to the first UE, and the base station may transmit a DCI related to activation or release of the CG resource(s) to the first UE.

In step S610, the first UE may transmit a PSCCH (e.g., sidelink control information (SCI) or 1st-stage SCI) to a second UE based on the resource scheduling. In step S620, the first UE may transmit a PSSCH (e.g., 2nd-stage SCI, MAC PDU, data, etc.) related to the PSCCH to the second UE. In step S630, the first UE may receive a PSFCH related to the PSCCH/PSSCH from the second UE. For example, HARQ feedback information (e.g., NACK information or ACK information) may be received from the second UE through the PSFCH. In step S640, the first UE may transmit/report HARQ feedback information to the base station through the PUCCH or the PUSCH. For example, the HARQ feedback information reported to the base station may be information generated by the first UE based on the HARQ feedback information received from the second UE. For example, the HARQ feedback information reported to the base station may be information generated by the first UE based on a pre-configured rule. For example, the DCI may be a DCI for SL scheduling. For example, a format of the DCI may be a DCI format 3_0 or a DCI format 3_1. Table 5 shows an example of a DCI for SL scheduling.

TABLE 5

| 3GPP TS 38.212 |
|---|
| 7.3.1.4.1 Format 3_0 |
| DCI format 3_0 is used for scheduling of NR PSCCH and NR PSSCH in one cell.<br>The following information is transmitted by means of the DCI format 3_0 with CRC scrambled by SL-RNTI or SL-CS-RNTI:<br>Resource pool index - $\lceil \log_2 I \rceil$ bits, where I is the number of resource pools for transmission configured by the higher layer parameter sl-TxPoolScheduling.<br>Time gap - 3 bits determined by higher layer parameter sl-DCI-ToSL-Trans, as defined in clause 8.1.2.1 of [6, TS 38.214]<br>HARQ process number - 4 bits as defined in clause 16.4 of [5, TS 38.213]<br>New data indicator - 1 bit as defined in clause 16.4 of [5, TS 38.213]<br>Lowest index of the subchannel allocation to the initial transmission - $\lceil \log_2(N^{SL}_{subChannel}) \rceil$ bits as defined in clause 8.1.2.2 of [6, TS 38.214]<br>SCI format 1-A fields according to clause 8.3.1.1:<br>Frequency resource assignment.<br>Time resource assignment.<br>PSFCH-to-HARQ feedback timing indicator - $\lceil \log_2 N_{fb\_timing} \rceil$ bits, where $N_{fb\_timing}$ is the number of entries in the higher layer parameter sl-PSFCH-ToPUCCH, as defined in clause 16.5 of [5, TS 38.213]<br>PUCCH resource indicator - 3 bits as defined in clause 16.5 of [5, TS 38.213].<br>Configuration index - 0 bit if the UE is not configured to monitor DCI format 3_0 with CRC scrambled by SL-CS-RNTI; otherwise 3 bits as defined in clause 8.1.2 of [6, TS 38.214]. If the UE is configured to monitor DCI format 3_0 with CRC scrambled by SL-CS-RNTI, this field is reserved for DCI format 3_0 with CRC scrambled by SL-RNTI.<br>Counter sidelink assignment index - 2 bits<br>2 bits as defined in clause 16.5.2 of [5, TS 38.213] if the UE is configured with pdsch-HARQ-ACK-Codebook = dynamic<br>2 bits as defined in clause 16.5.1 of [5, TS 38.213] if the UE is configured with pdsch-HARQ-ACK-Codebook = semi-static<br>Padding bits, if required |
| 7.3.1.4.2 Format 3_1 |
| DCI format 3_1 is used for scheduling of LTE PSCCH and LTE PSSCH in one cell.<br>The following information is transmitted by means of the DCI format 3_1 with CRC scrambled by SL-L-CS-RNTI:<br>Timing offset - 3 bits determined by higher layer parameter sl-TimeOffsetEUTRA, as defined in clause 16.6 of [5, TS 38.213]<br>Carrier indicator -3 bits as defined in 5.3.3.1.9A of [11, TS 36.212].<br>Lowest index of the subchannel allocation to the initial transmission - $\lceil \log_2(N^{SL}_{subChannel}) \rceil$ bits as defined in 5.3.3.1.9A of [11, TS 36.212].<br>Frequency resource location of initial transmission and retransmission, as defined in 5.3.3.1.9A of [11, TS 36.212]<br>Time gap between initial transmission and retransmission, as defined in 5.3.3.1.9A of [11, TS 36.212]<br>SL index - 2 bits as defined in 5.3.3.1.9A of [11, TS 36.212]<br>SL SPS configuration index - 3 bits as defined in clause 5.3.3.1.9A of [11, TS 36.212].<br>Activation/release indication - 1 bit as defined in clause 5.3.3.1.9A of [11, TS 36.212]. |

Referring to (b) of FIG. 6, in the LTE transmission mode 2, the LTE transmission mode 4, or the NR resource allocation mode 2, a UE may determine SL transmission resource(s) within SL resource(s) configured by a base station/network or pre-configured SL resource(s). For example, the configured SL resource(s) or the pre-configured SL resource(s) may be a resource pool. For example, the UE may autonomously select or schedule resource(s) for SL transmission. For example, the UE may perform SL communication by autonomously selecting resource(s) within the configured resource pool. For example, the UE may autonomously select resource(s) within a selection window by performing a sensing procedure and a resource (re) selection procedure. For example, the sensing may be performed in a unit of subchannel(s). For example, in step S610, a first UE which has selected resource(s) from a resource pool by itself may transmit a PSCCH (e.g., sidelink control information (SCI) or 1st-stage SCI) to a second UE by using the resource(s). In step S620, the first UE may transmit a PSSCH (e.g., 2nd-stage SCI, MAC PDU, data, etc.) related to the PSCCH to the second UE. In step S630, the first UE may receive a PSFCH related to the PSCCH/PSSCH from the second UE.

Referring to (a) or (b) of FIG. 6, for example, the first UE may transmit a SCI to the second UE through the PSCCH. Alternatively, for example, the first UE may transmit two consecutive SCIs (e.g., 2-stage SCI) to the second UE through the PSCCH and/or the PSSCH. In this case, the second UE may decode two consecutive SCIs (e.g., 2-stage SCI) to receive the PSSCH from the first UE. In the present disclosure, a SCI transmitted through a PSCCH may be referred to as a 1st SCI, a first SCI, a 1st-stage SCI or a 1st-stage SCI format, and a SCI transmitted through a PSSCH may be referred to as a 2nd SCI, a second SCI, a 2nd-stage SCI or a 2nd-stage SCI format. For example, the 1st-stage SCI format may include a SCI format 1-A, and the 2nd-stage SCI format may include a SCI format 2-A and/or a SCI format 2-B. Table 6 shows an example of a 1st-stage SCI format.

TABLE 6

3GPP TS 38.212

8.3.1.1 SCI format 1-A

SCI format 1-A is used for the scheduling of PSSCH and $2^{nd}$-stage-SCI on PSSCH The following information is transmitted by means of the SCI format 1-A:

Priority - 3 bits as specified in clause 5.4.3.3 of [12, TS 23.287] and clause 5.22.1.3.1 of [8, TS 38.321].

Frequency resource assignment – $\left\lceil \log_2\left(\frac{N^{SL}_{subChannel}(N^{SL}_{subChannel}+1)}{2}\right)\right\rceil$ bits when the value of the higher layer parameter sl-MaxNumPerReserve is configured to 2; otherwise $\left\lceil \log_2\left(\frac{N^{SL}_{subChannel}(N^{SL}_{subChannel}+1)(2N^{SL}_{subChannel}+1)}{6}\right)\right\rceil$ bits when the value of the higher layer parameter sl-MaxNumPerReserve is configured to 3, as defined in clause 8.1.2.2 of [6, TS 38.214].

Time resource assignment - 5 bits when the value of the higher layer parameter sl-MaxNumPerReserve is configured to 2; otherwise 9 bits when the value of the higher layer parameter sl-MaxNumPerReserve is configured to 3, as defined in clause 8.1.2.1 of [6, TS 38.214].

Resource reservation period - $\lceil \log_2 N_{rsv\_period} \rceil$ bits as defined in clause 8.1.4 of [6, TS 38.214], where $N_{rsv\_period}$ is the number of entries in the higher layer parameter sl-ResourceReservePeriodList, if higher layer parameter sl-MultiReserveResource is configured; 0 bit otherwise.

DMRS pattern - $\lceil \log_2 N_{pattern} \rceil$ bits as defined in clause 8.4.1.1.2 of [4, TS 38.211], where $N_{pattern}$ is the number of DMRS patterns configured by higher layer parameter sl-PSSCH-DMRS-TimePatternList.

$2^{nd}$-stage SCI format - 2 bits as defined in Table 8.3.1.1-1.

Beta_offset indicator - 2 bits as provided by higher layer parameter sl-BetaOffsets2ndSCI and Table 8.3.1.1-2.

Number of DMRS port - 1 bit as defined in Table 8.3.1.1-3.

Modulation and coding scheme - 5 bits as defined in clause 8.1.3 of [6, TS 38.214].

Additional MCS table indicator - as defined in clause 8.1.3.1 of [6, TS 38.214]: 1 bit if one MCS table is configured by higher layer parameter sl-Additional-MCS-Table; 2 bits if two MCS tables are configured by higher layer parameter sl-Additional-MCS-Table; 0 bit otherwise.

PSFCH overhead indication - 1 bit as defined clause 8.1.3.2 of [6, TS 38.214] if higher layer parameter sl-PSFCH-Period = 2 or 4; 0 bit otherwise.

Reserved - a number of bits as determined by higher layer parameter sl-NumReservedBits, with value set to zero.

Table 8.3.1.1-1: $2^{nd}$-stage SCI formats

| Value of 2nd-stage SCI format field | 2nd-stage SCI format |
|---|---|
| 00 | SCI format 2-A |
| 01 | SCI format 2-B |
| 10 | Reserved |
| 11 | Reserved |

TABLE 6-continued

3GPP TS 38.212

Table 8.3.1.1-2: Mapping of Beta_offset indicator values to indexes in Table 9.3-2 of [5, TS38.213]

| Value of Beta_offset indicator | Beta_offset index in TGable 9.3-2 of [5, TS38.213] |
|---|---|
| 00 | 1st index provided by higher layer parameter sl-BetaOffsets2ndSCI |
| 01 | 2nd index provided by higher layer parameter sl-BetaOffsets2ndSCI |
| 10 | 3rd index provided by higher layer parameter sl-BetaOffsets2ndSCI |
| 11 | 4th index provided by higher layer parameter sl-BetaOffsets2ndSCI |

Table 8.3.1.1-3: Number of DMRS port(s)

| Value of the Number of DMRS port field | Antenna ports |
|---|---|
| 0 | 1000 |
| 1 | 1000 and 1001 |

Table 7 shows an example of a 2nd-stage SCI format.

TABLE 7

3GPP TS 38.212

8.4.1.1 SCI format 2-A

SCI format 2-A is used for the decoding of PSSCH, with HARQ operation when HARQ-ACK information includes ACK or NACK, when HARQ-ACK information includes only NACK, or when there is no feedback of HARQ-ACK information.

The following information is transmitted by means of the SCI format 2-A:

- HARQ process number - 4 bits as defined in clause 16.4 of [5, TS 38.213].
- New data indicator - 1 bit as defined in clause 16.4 of [5, TS 38.213].
- Redundancy version - 2 bits as defined in clause 16.4 of [6, TS 38.214].
- Source ID - 8 bits as defined in clause 8.1 of [6, TS 38.214].
- Destination ID - 16 bits as defined in clause 8.1 of [6, TS 38.214].
- HARQ feedback enabled/disabled indicator - 1 bit as defined in clause 16.3 of [5, TS 38.213].
- Cast type indicator - 2 bits as defined in Table 8.4.1.1-1.
- CSI request - 1 bit as defined in clause 8.2.1 of [6, TS 38.214].

Table 8.4.1.1-1: Cast type indicator

| Value of Cast type indicator | Cast type |
|---|---|
| 00 | Broadcast |
| 01 | Groupcast when HARQ-ACK information includes ACK or NACK |
| 10 | Unicast |
| 11 | Groupcast when HARQ-ACK information includes only NACK |

8.4.1.2 SCI format 2-B

SCI format 2-B is used for the decoding of PSSCH, with HARQ operation when HARQ-ACK information includes only NACK, or when there is no feedback of HARQ-ACK information.

The following information is transmitted by means of the SCI format 2-B:

- HARQ process number - 4 bits as defined in clause 16.4 of [5, TS 38.213].
- New data indicator - 1 bit as defined in clause 16.4 of [5, TS 38.213].
- Redundancy version - 2 bits as defined in clause 16.4 of [6, TS 38.214].
- Source ID - 8 bits as defined in clause 8.1 of [6, TS 38.214].
- Destination ID - 16 bits as defined in clause 8.1 of [6, TS 38.214].
- HARQ feedback enabled/disabled indicator - 1 bit as defined in clause 16.3 of [5, TS 38.213].
- Zone ID - 12 bits as defined in clause 5.8.11 of [9, TS 38.331].
- Communication range requirement - 4 bits determined by higher layer parameter sl-ZoneConfigMCR-Index.

Referring to (a) or (b) of FIG. 6, in step S630, the first UE may receive the PSFCH based on Table 8. For example, the first UE and the second UE may determine a PSPCH resource based on Table 8, and the second UE may transmit HARQ feedback to the first UE using the PSPCH resource.

TABLE 8

| 3GPP TS 38.213 |
| --- |
| 16.3 UE procedure for reporting HARQ-ACK on sidelink |
| A UE can be indicated by an SCI format scheduling a PSSCH reception, in one or more sub-channels from a number of $N_{subch}^{PSSCH}$ sub-channels, to transmit a PSFCH with HARQ-ACK information in response to the PSSCH reception. The UE provides HARQ-ACK information that includes ACK or NACK, or only NACK. |
| A UE can be provided, by sl-PSFCH-Period-r16, a number of slots in a resource pool for a period of PSFCH transmission occasion resources. If the number is zero, PSFCH transmissions from the UE in the resource pool are disabled. |
| A UE expects that a slot $t'^{SL}_k (0 \le k < T'_{max})$ has a PSFCH transmission occasion resource if $k \bmod N_{PSSCH}^{PSFCH} = 0$, where $t'^{SL}_k$ is defined in [6, TS 38.214], and $T'_{max}$ is a number of slots that belong to the resource pool within 10240 msec according to [6, TS 38.214], and $N_{PSSCH}^{PSFCH}$ is provided by sl-PSFCH-Period-r16. |
| A UE may be indicated by higher layers to not transmit a PSFCH in response to a PSSCH reception [11, TS 38.321]. |
| If a UE receives a PSSCH in a resource pool and the HARQ feedback enabled/disabled indicator field in an associated SCI format 2-A or a SCI format 2-B has value 1 [5, TS 38.212], the UE provides the HARQ-ACK information in a PSFCH transmission in the resource pool. The UE transmits the PSFCH in a first slot that includes PSFCH resources and is at least a number of slots, provided by sl-MinTimeGapPSFCH-r16, of the resource pool after a last slot of the PSSCH reception. |
| A UE is provided by sl-PSFCH-RB-Set-r16 a set of $M_{PRB,set}^{PSFCH}$ PRBs in a resource pool for PSFCH transmission in a PRB of the resource pool. For a number of $N_{subch}$ sub-channels for the resource pool, provided by sl-NumSubchannel, and a number of PSSCH slots associated with a PSFCH slot that is less than or equal to $N_{PSSCH}^{PSFCH}$, the UE allocates the $[(i + j \cdot N_{PSSCH}^{PSFCH}) \cdot M_{subch,slot}^{PSFCH}, (i + 1 + j \cdot N_{PSSCH}^{PSFCH}) \cdot M_{subch,slot}^{PSFCH} - 1]$ PRBs from the $M_{PRB,set}^{PSFCH}$ PRBs to slot i among the PSSCH slots associated with the PSFCH slot and sub-channel j, where $M_{subch,slot}^{PSFCH} = M_{PRB,set}^{PSFCH} / (N_{subch} \cdot N_{PSSCH}^{PSFCH})$, $0 \le i < N_{PSSCH}^{PSFCH}$, $0 \le j < N_{subch}$, and the allocation starts in an ascending order of j. |
| The UE expects that $M_{PRB,set}^{PSFCH}$ is a multiple of $N_{subch} \cdot N_{PSSCH}^{PSFCH}$. |
| A UE determines a number of PSFCH resources available for multiplexing HARQ-ACK information in a PSFCH transmission as $R_{PRB,CS}^{PSFCH} = N_{type}^{PSFCH} \cdot M_{subch,slot}^{PSFCH} \cdot N_{CS}^{PSFCH}$ where $N_{CS}^{PSFCH}$ is a number of cyclic shift pairs for the resource pool and, based on an indication by higher layers, |
| $N_{type}^{PSFCH} = 1$ and the $M_{subch,slot}^{PSFCH}$ PRBs are associated with the starting sub-channel of the corresponding PSSCH |
| $N_{type}^{PSFCH} = N_{subch}^{PSSCH}$ and the $N_{subch}^{PSSCH} \cdot M_{subch,slot}^{PSFCH}$ PRBs are associated with one or more sub- |

TABLE 8-continued

| 3GPP TS 38.213 |
|---|
| channels from the $N_{subch}^{PSSCH}$ sub-channels of the corresponding PSSCH |
| The PSFCH resources are first indexed according to an ascending order of the PRB index, from the $N_{type}^{PSFCH} \cdot M_{subch,slot}^{PSFCH}$ PRBs, and then according to an ascending order of the cyclic shift pair index from the $N_{CS}^{PSFCH}$ cyclic shift pairs. |
| A UE determines an index of a PSFCH resource for a PSFCH transmission in response to a PSSCH reception as $(P_{ID} + M_{ID}) \bmod R_{PRB,CS}^{PSFCH}$ where $P_{ID}$ is a physical layer source ID provided by SCI format 2-A or 2-B [5, TS 38.212] scheduling the PSSCH reception, and $M_{ID}$ is the identity of the UE receiving the PSSCH as indicated by higher layers if the UE detects a SCI format 2-A with Cast type indicator field value of "01"; otherwise, $M_{ID}$ is zero. |
| A UE determines a $m_0$ value, for computing a value of cyclic shift $\alpha$ [4, TS 38.211], from a cyclic shift pair index corresponding to a PSFCH resource index and from $N_{CS}^{PSFCH}$ using Table 16.3-1. |

TABLE 16.3-1: Set of cyclic shift pairs

| | $m_0$ | | | | | |
|---|---|---|---|---|---|---|
| $N_{CS}^{PSFCH}$ | Cyclic Shift Pair Index 0 | Cyclic Shift Pair Index 1 | Cyclic Shift Pair Index 2 | Cyclic Shift Pair Index 3 | Cyclic Shift Pair Index 4 | Cyclic Shift Pair Index 5 |
| 1 | 0 | — | — | — | — | — |
| 2 | 0 | 3 | — | — | — | — |
| 3 | 0 | 2 | 4 | — | — | — |
| 6 | 0 | 1 | 2 | 3 | 4 | 5 |

A UE determines a $m_{cs}$ value, for computing a value of cyclic shift $\alpha$ [4, TS 38.211], as in Table 16.3-2 if the UE detects a SCI format 2-A with Cast type indicator field value of "01" or "10", or as in Table 16.3-3 if the UE detects a SCI format 2-B or a SCI format 2-A with Cast type indicator field value of "11". The UE applies one cyclic shift from a cyclic shift pair to a sequence used for the PSFCH transmission [4, TS 38.211].

Table 16.3-2: Mapping of HARQ-ACK information bit values to a cyclic shift, from a cyclic shift pair, of a sequence for a PSFCH transmission when HARQ-ACK information includes ACK or NACK

| HARQ-ACK Value | 0 (NACK) | 1 (ACK) |
|---|---|---|
| Sequence cyclic shift | 0 | 6 |

Table 16.3-3: Mapping of HARQ-ACK information bit values to a cyclic shift, from a cyclic shift pair, of a sequence for a PSFCH transmission when HARQ-ACK information includes only NACK

| HARQ-ACK Value | 0 (NACK) | 1 (ACK) |
|---|---|---|
| Sequence cyclic shift | 0 | N/A |

Referring to (a) of FIG. 6, in step S640, the first UE may transmit SL HARQ feedback to the base station through the PUCCH and/or the PUSCH based on Table 9.

TABLE 9

| 3GPP TS 38.213 |
|---|
| 16.5 UE procedure for reporting HARQ-ACK on uplink<br>A UE can be provided PUCCH resources or PUSCH resources [12, TS 38.331] to report HARQ-ACK information that the UE generates based on HARQ-ACK information that the UE obtains from PSFCH receptions, or from absence of PSFCH receptions. The UE reports HARQ-ACK |

TABLE 9-continued

| 3GPP TS 38.213 |
| --- |
| information on the primary cell of the PUCCH group, as described in Clause 9, of the cell where the UE monitors PDCCH for detection of DCI format 3_0.<br>For SL configured grant Type 1 or Type 2 PSSCH transmissions by a UE within a time period provided by sl-PeriodCG, the UE generates one HARQ-ACK information bit in response to the PSFCH receptions to multiplex in a PUCCH transmission occasion that is after a last time resource, in a set of time resources.<br>For PSSCH transmissions scheduled by a DCI format 3_0, a UE generates HARQ-ACK information in response to PSFCH receptions to multiplex in a PUCCH transmission occasion that is after a last time resource in a set of time resources provided by the DCI format 3_0.<br>For each PSFCH reception occasion, from a number of PSFCH reception occasions, the UE generates HARQ-ACK information to report in a PUCCH or PUSCH transmission. The UE can be indicated by a SCI format to perform one of the following and the UE constructs a HARQ-ACK codeword with HARQ-ACK information, when applicable<br>- if the UE receives a PSFCH associated with a SCI format 2-A with Cast type indicator field value of "10"<br>- generate HARQ-ACK information with same value as a value of HARQ-ACK information the UE determines from a PSFCH reception in the PSFCH reception occasion and, if the UE determines that a PSFCH is not received at the PSFCH reception occasion, generate NACK<br>- if the UE receives a PSFCH associated with a SCI format 2-A with Cast type indicator field value of "01"<br>- generate ACK if the UE determines ACK from at least one PSFCH reception occasion, from the number of PSFCH reception occasions, in PSFCH resources corresponding to every identity $M_{ID}$ of the UEs that the UE expects to receive the PSSCH, as described in Clause 16.3; otherwise, generate NACK<br>- if the UE receives a PSFCH associated with a SCI format 2-B or a SCI format 2-A with Cast type indicator field value of "11"<br>- generate ACK when the UE determines absence of PSFCH reception for each PSFCH reception occasion from the number of PSFCH reception occasions; otherwise, generate NACK<br>After a UE transmits PSSCHs and receives PSFCHs in corresponding PSFCH resource occasions, the priority value of HARQ-ACK information is same as the priority value of the PSSCH transmissions that is associated with the PSFCH reception occasions providing the HARQ-ACK information.<br>The UE generates a NACK when, due to prioritization, as described in Clause 16.2.4, the UE does not receive PSFCH in any PSFCH reception occasion associated with a PSSCH transmission in a resource provided by a DCI format 3_0 with CRC scrambled by a SL-RNTI or, for a configured grant, in a resource provided in a single period and for which the UE is provided a PUCCH resource to report HARQ-ACK information. The priority value of the NACK is same as the priority value of the PSSCH transmission.<br>The UE generates a NACK when, due to prioritization as described in Clause 16.2.4, the UE does not transmit a PSSCH in any of the resources provided by a DCI format 3_0 with CRC scrambled by SL-RNTI or, for a configured grant, in any of the resources provided in a single period and for which the UE is provided a PUCCH resource to report HARQ-ACK information. The priority value of the NACK is same as the priority value of the PSSCH that was not transmitted due to prioritization.<br>The UE generates an ACK if the UE does not transmit a PSCCH with a SCI format 1-A scheduling<br>a PSSCH in any of the resources provided by a configured grant in a single period and for which the UE is provided a PUCCH resource to report HARQ-ACK information. The priority value of the ACK is same as the largest priority value among the possible priority values for the configured grant.<br>A UE does not expect to be provided PUCCH resources or PUSCH resources to report HARQ-ACK information that start earlier than $(N + 1) \cdot (2048 + 144) \cdot \kappa \cdot 2^{\mu} \cdot T_c$ after the end of a last symbol of a last PSFCH reception occasion, from a number of PSFCH reception occasions that the UE generates HARQ-ACK information to report in a PUCCH or PUSCH transmission, where<br>- $\kappa$ and $T_c$ are defined in [4, TS 38.211]<br>- $\mu = \min(\mu_{SL}, \mu_{UL})$, where $\mu_{SL}$ is the SCS configuration of the SL BWP and $\mu_{UL}$ is the SCS configuration of the active UL BWP on the primary cell<br>- N is determined from $\mu$ according to Table 16.5-1 |

Table 16.5-1: Values of N

| $\mu$ | N |
| --- | --- |
| 0 | 14 |
| 1 | 18 |
| 2 | 28 |
| 3 | 32 |

With reference to slots for PUCCH transmissions and for a number of PSFCH reception occasions ending in slot n, the UE provides the generated HARQ-ACK information in a PUCCH transmission within slot n + k, subject to the overlapping conditions in Clause 9.2.5, where k is a number of slots indicated by a PSFCH-to-HARQ_feedback timing indicator field, if present, in a DCI format indicating a slot for PUCCH transmission to report the HARQ-ACK information, or k is provided by sl-PSFCH-ToPUCCH-CG-Type1-r16. k = 0 corresponds to a last slot for a PUCCH transmission that would overlap with the last PSFCH reception occasion assuming that the start of the sidelink frame is same as the start of the downlink frame [4, TS 38.211].

TABLE 9-continued

| 3GPP TS 38.213 |
|---|
| For a PSSCH transmission by a UE that is scheduled by a DCI format, or for a SL configured grant Type 2 PSSCH transmission activated by a DCI format, the DCI format indicates to the UE that a PUCCH resource is not provided when a value of the PUCCH resource indicator field is zero and a value of PSFCH-to-HARQ feedback timing indicator field, if present, is zero. For a SL configured grant Type 1 PSSCH transmission, a PUCCH resource can be provided by sl-N1PUCCH-AN-r16 and sl-PSFCH-ToPUCCH-CG-Type1-r16. If a PUCCH resource is not provided, the UE does not transmit a PUCCH with generated HARQ-ACK information from PSFCH reception occasions. |
| For a PUCCH transmission with HARQ-ACK information, a UE determines a PUCCH resource after determining a set of PUCCH resources for $O_{UCI}$ HARQ-ACK information bits, as described in Clause 9.2.1. The PUCCH resource determination is based on a PUCCH resource indicator field [5, TS 38.212] in a last DCI format 3_0, among the DCI formats 3_0 that have a value of a PSFCH-to-HARQ_feedback timing indicator field indicating a same slot for the PUCCH transmission, that the UE detects and for which the UE transmits corresponding HARQ-ACK information in the PUCCH where, for PUCCH resource determination, detected DCI formats are indexed in an ascending order across PDCCH monitoring occasion indexes. |
| A UE does not expect to multiplex HARQ-ACK information for more than one SL configured grants in a same PUCCH. |
| A priority value of a PUCCH transmission with one or more sidelink HARQ-ACK information bits is the smallest priority value for the one or more HARQ-ACK information bits. |
| In the following, the CRC for DCI format 3_0 is scrambled with a SL-RNTI or a SL-CS-RNTI. |

Sidelink Control Information (SCI)

Control information transmitted by a BS to a UE through a PDCCH may be referred to as downlink control information (DCI), whereas control information transmitted by the UE to another UE through a PSCCH may be referred to as SCI. For example, the UE may know in advance a start symbol of the PSCCH and/or the number of symbols of the PSCCH, before decoding the PSCCH. For example, the SCI may include SL scheduling information. For example, the UE may transmit at least one SCI to another UE to schedule the PSSCH. For example, one or more SCI formats may be defined.

For example, a transmitting UE may transmit the SCI to a receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, if SCI configuration fields are divided into two groups in consideration of a (relatively) high SCI payload size, an SCI including a first SCI configuration field group may be referred to as a first SCI or a 1st SCI, and an SCI including a second SCI configuration field group may be referred to as a second SCI or a 2nd SCI. For example, the transmitting UE may transmit the first SCI to the receiving UE through the PSCCH. For example, the transmitting UE may transmit the second SCI to the receiving UE on the PSCCH and/or the PSSCH. For example, the second SCI may be transmitted to the receiving UE through an (independent) PSCCH, or may be transmitted in a piggyback manner together with data through the PSSCH. For example, two consecutive SCIs may also be applied to different transmissions (e.g., unicast, broadcast, or groupcast).

In various embodiments of the present disclosure, since the transmitting UE may transmit at least one of the SCI, the first SCI, and/or the second SCI to the receiving UE through the PSCCH, the PSCCH may be replaced/substituted with at least one of the SCI, the first SCI, and/or the second SCI. Additionally/alternatively, for example, the SCI may be replaced/substituted with at least one of the PSCCH, the first SCI, and/or the second SCI. Additionally/alternatively, for example, since the transmitting UE may transmit the second SCI to the receiving UE through the PSSCH, the PSSCH may be replaced/substituted with the second SCI.

FIG. 7 shows three cast types based on an embodiment of the present disclosure.

Specifically, (a) of FIG. 7 shows broadcast-type SL communication, (b) of FIG. 7 shows unicast type-SL communication, and (c) of FIG. 7 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like. Hereinafter, an RRC connection establishment between UEs will be described.

For V2X or SL communication, a transmitting UE may need to establish a (PC5) RRC connection with a receiving UE. For example, the UE may obtain V2X-specific SIB. For a UE which is configured to transmit V2X or SL communication by a higher layer and which has data to be transmitted, if a frequency at which at least the UE is configured to transmit SL communication is included in the V2X-specific SIB, the UE may establish an RRC connection with another UE without including a transmission resource pool for the frequency. For example, if an RRC connection is established between the transmitting UE and the receiving UE, the transmitting UE may perform unicast communication with respect to the receiving UE through the established RRC connection.

When the RRC connection is established between the UEs, the transmitting UE may transmit an RRC message to the receiving UE.

The receiving UE may perform antenna/resource demapping, demodulation, and decoding for received information. The information may be transferred to the RRC layer via the MAC layer, the RLC layer, and the PDCP layer.

Accordingly, the receiving UE may receive the RRC message generated by the transmitting UE.

V2X or SL communication may be supported for a UE of an RRC_CONNECTED mode, a UE of an RRC_IDLE mode, and a UE of an (NR) RRC_INACTIVE mode. That is, the UE of the RRC_CONNECTED mode, the UE of the RRC_IDLE mode, and the UE of the (NR) RRC_INACTIVE mode may perform V2X or SL communication. The UE of the RRC_INACTIVE mode or the UE of the RRC_IDLE mode may perform V2X or SL communication by using a cell-specific configuration included in V2X-specific SIB.

RRC may be used to exchange at least UE capability and AS layer configuration. For example, a UE 1 may transmit UE capability and AS layer configuration of the UE 1 to a UE 2, and the UE 1 may receive UE capability and AS layer configuration of the UE 2 from the UE 2. In case of UE capability transfer, an information flow may be triggered during or after PC5-S signaling for a direct link setup.

Measurement and Reporting for SL

Hereinafter, SL measurement and reporting will be described.

For the purpose of QOS prediction, initial transmission parameter setting, link adaptation, link management, admission control, or the like, SL measurement and reporting (e.g., RSRP, RSRQ) between UEs may be considered in SL. For example, a receiving UE may receive a reference signal from a transmitting UE, and the receiving UE may measure a channel state for the transmitting UE based on the reference signal. In addition, the receiving UE may report channel state information (CSI) to the transmitting UE. SL-related measurement and reporting may include measurement and reporting of CBR and reporting of location information. Examples of channel status information (CSI) for V2X may include a channel quality indicator (CQI), a precoding matrix index (PM), a rank indicator (RI), reference signal received power (RSRP), reference signal received quality (RSRQ), pathgain/pathloss, a sounding reference symbol (SRS) resource indicator (SRI), a SRI-RS resource indicator (CRI), an interference condition, a vehicle motion, or the like. In case of unicast communication, CQI, RI, and PMI or some of them may be supported in a non-subband-based aperiodic CSI report under the assumption of four or less antenna ports. A CSI procedure may not be dependent on a standalone reference signal (RS). A CSI report may be activated or deactivated based on a configuration.

For example, the transmitting UE may transmit CSI-RS to the receiving UE, and the receiving UE may measure CQI or RI based on the CSI-RS. For example, the CSI-RS may be referred to as SL CSI-RS. For example, the CSI-RS may be confined within PSSCH transmission. For example, the transmitting UE may perform transmission to the receiving UE by including the CSI-RS on the PSSCH.

Hybrid Automatic Repeat Request (HARQ) for SL

Hereinafter, a hybrid automatic repeat request (HARQ) procedure will be described.

An error compensation scheme is used to secure communication reliability. Examples of the error compensation scheme may include a forward error correction (FEC) scheme and an automatic repeat request (ARQ) scheme. In the FEC scheme, errors in a receiving end are corrected by attaching an extra error correction code to information bits. The FEC scheme has an advantage in that time delay is small and no information is additionally exchanged between a transmitting end and the receiving end but also has a disadvantage in that system efficiency deteriorates in a good channel environment. The ARQ scheme has an advantage in that transmission reliability can be increased but also has a disadvantage in that a time delay occurs and system efficiency deteriorates in a poor channel environment.

A hybrid automatic repeat request (HARQ) scheme is a combination of the FEC scheme and the ARQ scheme. In the HARQ scheme, it is determined whether an unrecoverable error is included in data received by a physical layer, and retransmission is requested upon detecting the error, thereby improving performance.

In case of SL unicast and groupcast, HARQ feedback and HARQ combining in the physical layer may be supported. For example, when a receiving UE operates in a resource allocation mode 1 or 2, the receiving UE may receive the PSSCH from a transmitting UE, and the receiving UE may transmit HARQ feedback for the PSSCH to the transmitting UE by using a sidelink feedback control information (SFCI) format through a physical sidelink feedback channel (PSFCH).

For example, the SL HARQ feedback may be enabled for unicast. In this case, in a non-code block group (non-CBG) operation, if the receiving UE decodes a PSCCH of which a target is the receiving UE and if the receiving UE successfully decodes a transport block related to the PSCCH, the receiving UE may generate HARQ-ACK. In addition, the receiving UE may transmit the HARQ-ACK to the transmitting UE. Otherwise, if the receiving UE cannot successfully decode the transport block after decoding the PSCCH of which the target is the receiving UE, the receiving UE may generate the HARQ-NACK. In addition, the receiving UE may transmit HARQ-NACK to the transmitting UE.

For example, the SL HARQ feedback may be enabled for groupcast. For example, in the non-CBG operation, two HARQ feedback options may be supported for groupcast.

(1) Groupcast option 1: After the receiving UE decodes the PSCCH of which the target is the receiving UE, if the receiving UE fails in decoding of a transport block related to the PSCCH, the receiving UE may transmit HARQ-NACK to the transmitting UE through a PSFCH. Otherwise, if the receiving UE decodes the PSCCH of which the target is the receiving UE and if the receiving UE successfully decodes the transport block related to the PSCCH, the receiving UE may not transmit the HARQ-ACK to the transmitting UE.

(2) Groupcast option 2: After the receiving UE decodes the PSCCH of which the target is the receiving UE, if the receiving UE fails in decoding of the transport block related to the PSCCH, the receiving UE may transmit HARQ-NACK to the transmitting UE through the PSFCH. In addition, if the receiving UE decodes the PSCCH of which the target is the receiving UE and if the receiving UE successfully decodes the transport block related to the PSCCH, the receiving UE may transmit the HARQ-ACK to the transmitting UE through the PSFCH.

For example, if the groupcast option 1 is used in the SL HARQ feedback, all UEs performing groupcast communication may share a PSFCH resource. For example, UEs belonging to the same group may transmit HARQ feedback by using the same PSFCH resource.

For example, if the groupcast option 2 is used in the SL HARQ feedback, each UE performing groupcast communication may use a different PSFCH resource for HARQ feedback transmission. For example, UEs belonging to the same group may transmit HARQ feedback by using different PSFCH resources.

In the present disclosure, HARQ-ACK may be referred to as ACK, ACK information, or positive-ACK information, and HARQ-NACK may be referred to as NACK, NACK information, or negative-ACK information.

Bandwidth Part and Resource Pool

Hereinafter, a bandwidth part (BWP) and a resource pool will be described.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a location change of the bandwidth, or a change in subcarrier spacing of the bandwidth.

For example, the bandwidth may be decreased during a duration in which activity is low to save power. For example, the location of the bandwidth may move in a frequency domain. For example, the location of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be referred to as a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific duration, the UE may switch the active BWP of the UE to the default BWP.

Meanwhile, the BWP may be defined for SL. The same SL BWP may be used in transmission and reception. For example, a transmitting UE may transmit a SL channel or a SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-) configured in a carrier with respect to an out-of-coverage NR V2X UE and an RRC_IDLE UE. For the UE in the RRC_CONNECTED mode, at least one SL BWP may be activated in the carrier.

FIG. 8 shows a plurality of BWPs based on an embodiment of the present disclosure.

Referring to FIG. 8, a BWP1 having a bandwidth of 40 MHz and a subcarrier spacing of 15 kHz, a BWP2 having a bandwidth of 10 MHz and a subcarrier spacing of 15 kHz, and a BWP3 having a bandwidth of 20 MHz and a subcarrier spacing of 60 kHz may be configured.

FIG. 9 shows a BWP based on an embodiment of the present disclosure. It is assumed in the embodiment of FIG. 9 that the number of BWPs is 3.

Referring to FIG. 9, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset NstartBWP from the point A, and a bandwidth NsizeBWP. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

The BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-) configured in a carrier with respect to an out-of-coverage NR V2X UE and an RRC_IDLE UE. For the UE in the RRC_CONNECTED mode, at least one SL BWP may be activated in the carrier.

A resource pool may be a group of time-frequency resources that may be used for SL transmission and/or SL reception. From a perspective of the UE, time-domain resources in the resource pool may not be consecutive. A plurality of resource pools may be (pre-) configured to the UE in one carrier. From a perspective of a physical layer, the UE may perform unicast, groupcast, and broadcast communication by using the configured or pre-configured resource pool.

Sidelink (SL) Congestion Control

Hereinafter, sidelink (SL) congestion control will be described.

If a UE autonomously determines an SL transmission resource, the UE also autonomously determines a size and frequency of use for a resource used by the UE. Of course, due to a constraint from a network or the like, it may be restricted to use a resource size or frequency of use, which is greater than or equal to a specific level. However, if all UEs use a relatively great amount of resources in a situation where many UEs are concentrated in a specific region at a specific time, overall performance may significantly deteriorate due to mutual interference.

Accordingly, the UE may need to observe a channel situation. If it is determined that an excessively great amount of resources are consumed, it is preferable that the UE autonomously decreases the use of resources. In the present disclosure, this may be defined as congestion control (CR).

For example, the UE may determine whether energy measured in a unit time/frequency resource is greater than or equal to a specific level, and may adjust an amount and frequency of use for its transmission resource based on a ratio of the unit time/frequency resource in which the energy greater than or equal to the specific level is observed. In the present disclosure, the ratio of the time/frequency resource in which the energy greater than or equal to the specific level is observed may be defined as a channel busy ratio (CBR). The UE may measure the CBR for a channel/frequency. Additionally, the UE may transmit the measured CBR to the network/BS.

FIG. 10 shows a resource unit for CBR measurement based on an embodiment of the present disclosure.

Referring to FIG. 10, CBR may denote the number of sub-channels in which a measurement result value of a received signal strength indicator (RSSI) has a value greater than or equal to a pre-configured threshold as a result of measuring the RSSI by a UE on a sub-channel basis for a specific duration (e.g., 100 ms). Alternatively, the CBR may denote a ratio of sub-channels having a value greater than or equal to a pre-configured threshold among sub-channels for a specific duration. For example, in the embodiment of FIG. 10, if it is assumed that a hatched sub-channel is a sub-channel having a value greater than or equal to a pre-configured threshold, the CBR may denote a ratio of the hatched sub-channels for a duration of 100 ms. Additionally, the CBR may be reported to the BS.

FIG. 11 illustrates a resource pool related to CBR measurement.

For example, as shown in the embodiment of FIG. 11, if a PSCCH and a PSSCH are multiplexed, the UE may perform one CBR measurement for one resource pool. Herein, if a PSFCH resource is configured or pre-configured, the PSFCH resource may be excluded in the CBR measurement.

Further, congestion control considering a priority of traffic (e.g. packet) may be necessary. To this end, for example, the UE may measure a channel occupancy ratio (CR). Specifically, the UE may measure the CBR, and the UE may determine a maximum value CRlimitk of a channel occupancy ratio k (CRk) that can be occupied by traffic corresponding to each priority (e.g., k) based on the CBR. For example, the UE may derive the maximum value CRlimitk of the channel occupancy ratio with respect to a priority of each traffic, based on a predetermined table of CBR measurement values. For example, in case of traffic having a relatively high priority, the UE may derive a maximum value of a relatively great channel occupancy ratio. Thereafter, the UE may perform congestion control by restricting a total sum of channel occupancy ratios of traffic, of which a priority k is lower than i, to a value less than or equal to a specific value. Based on this method, the channel occupancy ratio may be more strictly restricted for traffic having a relatively low priority.

In addition thereto, the UE may perform SL congestion control by using a method of adjusting a level of transmit power, dropping a packet, determining whether retransmission is to be performed, adjusting a transmission RB size (MCS coordination), or the like.

Table 10 shows an example of SL CBR and SL RSSI.

TABLE 10

| SL CBR | |
|---|---|
| Definition | SL Channel Busy Ratio (SL CBR) measured in slot a is defined as the portion of sub-channels in the resource pool whose SL RSSI measured by the UE exceed a (pre-)configured threshold sensed over a CBR measurement window [n − a, n − 1], wherein s is equal to 100 of 100 · $2^{\mu}$ slots, according to higher layer parameter timeWindowSize-CBR. |
| Applicable for | RRC_IDLE intra-frequency, RRC_IDLE inter-frequency, RRC_CONNECTED intra-frequency, RRC_CONNECTED inter-frequency |
| **SL RSSI** | |
| Definition | Sidelink Received Signal Strength indicator (SL RSSI) is defined as the linear average of the total received power (in [W]) observed in the configured sub-channel in OFDM symbols of a slot configured for PSCCH and PSSCH, starting from the $2^{nd}$ OFDM symbol. For frequency range 1, the reference point for the SL RSSI shall be the antenna connector of the UE. For frequency range 2, SL RSSI shall be measured based on the combined signal from antenna elements corresponding to a given receiver branch. For frequency range 1 and 2, if receiver diversity is in use by the UE, the reported SL RSSI value shall not be lower than the corresponding SL RSSI of any of the Individual receiver branches. |
| Applicable for | RRC_IDLE intra-frequency, RRC_IDLE inter-frequency, RRC_CONNECTED intra-frequency, RRC_CONNECTED inter-frequency |

Referring to Table 10, the slot index may be based on a physical slot index.

Table 11 shows an example of SL Channel Occupancy Ratio (CR).

TABLE 11

| | |
|---|---|
| Definition | Sidelink Channel Occupancy Ratio (SL CR) evaluated at slot n is defined as the total number of sub-channels used for its transmissions in slots [n − a, n − 1] and granted in slots [n, n + b] divided by the total number of configured sub-channels in the transmission pool over [n − a, n + b]. |
| Applicable for | RRC_IDLE intra-frequency, RRC_IDLE inter-frequency, RRC_CONNECTED intra-frequency, |

TABLE 11-continued

| |
|---|
| RRC_CONNECTED inter-frequency |

NOTE 1:
a is a positive integer and b is 0 or a positive integer; a and b are determined by UE implementation with a + b + 1 = 1000 or 1000 · $2^{\mu}$ slots, according to higher layer parameter timeWindowSize-CR, b < (a + b + 1)/2, and n + b shall not exceed the last transmission opportunity of the grant for the current transmission.
NOTE 2:
SL CR is evaluated for each (re)transmission.
NOTE 3:
In evaluating SL CR, the UE shall assume the transmission parameter used at slot n is reused according to the existing grant(s) in slot [n + 1, n + 6] without packet dropping.
NOTE 4:
The slot index is based on physical slot index.
NOTE 5:
SL CR can be computed per priority level
NOTE 6:
A resource is considered granted if it is a member of a selected sidelink grant as defined in TS 38.321 [7], Discontinuous Reception (DRX) Operation A UE may perform a DRX operation while performing procedures and/or methods described/proposed above. The UE configured with the DRX discontinuously receives a DL signal and can reduce power consumption. The DRX may be performed in a radio resource control (RRC)_IDLE state, an RRC_INACTIVE state, and an RRC_CONNECTED state.

RRC_CONNECTED DRX

In the RRC_CONNECTED state, the DRX is used for discontinuous reception of the PDCCH. For convenience, the DRX performed in the RRC_CONNECTED state is referred to as RRC_CONNECTED DRX.

FIG. 12 illustrates an example of a DRX cycle to which a method described in the present disclosure is applicable.

Referring to FIG. 12, a DRX cycle consists of On Duration and Opportunity for DRX. The DRX cycle defines a time interval in which the On Duration is periodically repeated. The On Duration represents a time duration in which the UE monitors in order to receive the PDCCH. If the DRX is configured, the UE performs the PDCCH monitoring during the Onduration. If there is a PDCCH which is successfully detected during the PDCCH monitoring, the UE runs an inactivity timer and maintains an awake state. On the other hand, if there is no PDCCH which is successfully detected during the PDCCH monitoring, the UE enters a sleep state after the On Duration ends.

Therefore, if the DRX is configured, the PDCCH monitoring/reception may be discontinuously performed in the time domain in performing the procedures and/or methods described/proposed above.

For example, if the DRX is configured, the PDCCH monitoring in the present disclosure may be discontinuously performed based on the DRX configuration in activated cell(s). Specifically, if a PDCCH occasion (e.g., a time duration configured to monitor the PDCCH (e.g., one or more contiguous OFDM symbols)) corresponds to the On Duration, the PDCCH monitoring may be performed, and if the PDCCH occasion corresponds to the Opportunity for DRX, the PDCCH monitoring may be skipped. On the other hand, if the DRX is not configured, the PDCCH monitoring/reception may be continuously performed in the time domain in performing the procedures and/or methods described/proposed above.

For example, if the DRX is not configured, the PDCCH reception occasion in the present disclosure may be continuously configured. Regardless of whether the DRX is configured, the PDCCH monitoring may be limited in a time duration configured as a measurement gap.

Table 12 below represents a process of the UE related to the DRX (RRC_CONNECTED state). Referring to Table 12, DRX configuration information is received via higher layer (e.g., RRC) signaling, and whether the DRX is on or off is controlled by a DRX command of an MAC layer. If the DRX is configured, the UE, as illustrated in FIG. 12, may discontinuously perform the PDCCH monitoring in performing the procedures and/or methods described/proposed in the present disclosure.

TABLE 12

| | Type of signals | UE procedure |
|---|---|---|
| 1st step | RRC signalling (MAC-CellGroupConfig) | Receive DRX configuration information |
| 2nd Step | MAC CE ((Long) DRX command MAC CE) | Receive DRX command |
| 3rd Step | — | Monitor a PDCCH during an on-duration of a DRX cycle |

MAC-CellGroupConfig includes configuration information required for configuring medium access control (MAC) parameters for a cell group. MAC-CellGroupConfig may include configuration information for the DRX. For example, MAC-CellGroupConfig may include information as follows when defining the DRX.

- Value of drx-OnDuration Timer: Defining a length of a start duration of the DRX cycle
- Value of drx-InactivityTimer: Defining a length of a time duration in which the UE is in an awake state after a PDCCH occasion in which a PDCCH indicating initial UL or DL data is detected
- Value of drx-HARQ-RTT-TimerDL: Defining a length of a maximum time duration until DL retransmission is received after DL initial transmission is received
- Value of drx-HARQ-RTT-TimerUL: Defining the length of a maximum time duration until a grant for UL retransmission is received after a grant for UL initial transmission is received drx-LongCycleStartOffset: Defining a time length and a start time of the DRX cycle drx-ShortCycle (optional): Defining a time length of a short DRX cycle If any one of drx-OnDurationTimer and drx-Inactivity-Timer is running, the UE performs the PDCCH monitoring every PDCCH occasion while maintaining the awake state.

RRC_IDLE DRX

In the RRC_IDLE state and the RRC_INACTIVE state, the DRX is used to discontinuously receive a paging signal. For convenience, the DRX performed in the RRC_IDLE (or RRC_INACTIVE) state is referred to as RRC_IDLE DRX.

Thus, if the DRX is configured, the monitoring/reception of the paging signal (or paging message) may be discontinuously performed in the time domain in performing the procedures and/or methods described/proposed above.

DRX may be configured for discontinuous reception of the paging signal. The UE may receive DRX configuration information from a base station via higher layer (e.g., RRC) signaling. The DRX configuration information may include configuration information for a DRX cycle, a DRX offset, and DRX timer, etc. The UE repeats On Duration and Sleep Duration according to the DRX cycle. The UE may operate in a wakeup mode in the On duration and operate in a sleep mode in the Sleep duration. In the wakeup mode, the UE may monitor a PO in order to receive a paging message. The PO means a time resource/duration (e.g., subframe or slot) in which the UE expects to receive the paging message. PO monitoring includes monitoring PDCCH (or MPDCCH or NPDCCH) (hereinafter, referred to as paging PDCCH) scrambled by P-RNTI in the PO. The paging message may be included in a paging PDCCH or included in a PDSCH scheduled by the paging PDCCH. One or a plurality of PO(s) may be included in a paging frame (PF), and the PF may be periodically configured based on UE ID. The PF may correspond to one radio frame, and the UE ID may be determined based on an international mobile subscriber identity (IMSI) of the UE. If the DRX is configured, the UE monitors only one PO per DRX cycle. If the UE receives the paging message indicating changes in an ID of the UE and/or system information in the PO, the UE may perform a RACH procedure in order to initialize (or reconfigure) connectivity with the base station, or receive (or acquire) new system information from the base station. Thus, when performing the procedure and/or method described/proposed above, the PO monitoring may be discontinuously performed in the time domain in order to perform the RACH for connectivity with the base station or receive (or acquire) the new system information from the base station.

Table 13 below shows an example of configuration/operation related to DRX.

TABLE 13

| 3GPP TS 38.321 V16.2.1 |
|---|
| The MAC entity may be configured by RRC with a DRX functionality that controls the UE's PDCCH monitoring activity for the MAC entity's C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, and AI-RNTI. When using DRX operation, the MAC entity shall also monitor PDCCH according to requirements found in other clauses of this specification. When in RRC_CONNECTED, if DRX is configured, for all the activated Serving Cells, the MAC entity may monitor the PDCCH discontinuously using the DRX operation specified in this clause; otherwise the MAC entity shall monitor the PDCCH as specified in TS 38.213 [6]. |
| NOTE 1: If Sidelink resource allocation mode 1 is configured by RRC, a DRX functionality is not configured. |
| RRC controls DRX operation by configuring the following parameters: |
| - drx-onDurationTimer: the duration at the beginning of a DRX cycle; |
| - drx-SlotOffset: the delay before starting the drx-onDurationTimer; |
| - drx-InactivityTimer: the duration after the PDCCH occasion in which a PDCCH indicates a new UL or DL transmission for the MAC entity; |
| - drx-RetransmissionTimerDL (per DL HARQ process except for the broadcast process): the maximum duration until a DL retransmission is received; |
| - drx-RetransmissionTimerUL (per UL HARQ process): the maximum duration until a grant for UL retransmission is received; |
| - drx-LongCycleStartOffset: the Long DRX cycle and drx-StartOffset which defines the subframe where the Long and Short DRX cycle starts; |
| - drx-ShortCycle (optional): the Short DRX cycle; |
| - drx-ShortCycleTimer (optional): the duration the UE shall follow the Short DRX cycle; |
| - drx-HARQ-RTT-TimerDL (per DL HARQ process except for the broadcast process): the minimum duration before a DL assignment for HARQ retransmission is expected by the MAC entity; |
| - drx-HARQ-RTT-TimerUL (per UL HARQ process): the minimum duration before a UL HARQ retransmission grant is expected by the MAC entity; |
| - ps-Wakeup (optional): the configuration to start associated drx-onDurationTimer in case DCP is monitored but not detected; |
| - ps-TransmitOtherPeriodicCSI (optional): the configuration to report periodic CSI that is not L1-RSRP on PUCCH during the time duration indicated by drx-onDurationTimer in case DCP is configured but associated drx-onDurationTimer is not started; |
| - ps-TransmitPeriodicL1-RSRP (optional): the configuration to transmit periodic CSI that is L1-RSRP on PUCCH during the time duration indicated by drx-onDurationTimer in case DCP is configured but associated drx-onDurationTimer is not started. |
| Serving Cells of a MAC entity may be configured by RRC in two DRX groups with separate DRX parameters. When RRC does not configure a secondary DRX group, there is only one DRX group and all Serving Cells belong to that one DRX group. When two DRX groups are configured, each Serving Cell is uniquely assigned to either of the two groups. The DRX parameters that are separately configured for each DRX group are: drx-onDurationTimer, drx-InactivityTimer. The DRX parameters that are common to the DRX groups are: drx-SlotOffset, drx-RetransmissionTimerDL, drx-RetransmissionTimerUL, drx-LongCycleStartOffset, drx-ShortCycle (optional), drx-ShortCycleTimer (optional), drx-HARQ-RTT-TimerDL, and drx-HARQ-RTT-TimerUL. |
| When a DRX cycle is configured, the Active Time for Serving Cells in a DRX group includes the time while: |
| - drx-onDurationTimer or drx-InactivityTimer configured for the DRX group is running; or |
| - drx-RetransmissionTimerDL or drx-RetransmissionTimerUL is running on any Serving Cell in the DRX group; or |

TABLE 13-continued

3GPP TS 38.321 V16.2.1

- ra-ContentionResolutionTimer (as described in clause 5.1.5) or msgB-ResponseWindow (as described in clause 5.1.4a) is running; or
- a Scheduling Request is sent on PUCCH and is pending (as described in clause 5.4.4); or
- a PDCCH indicating a new transmission addressed to the C-RNTI of the MAC entity has not been received after successful reception of a Random Access Response for the Random Access Preamble not selected by the MAC entity among the contention-based Random Access Preamble (as described in clauses 5.1.4 and 5.1.4a).

When DRX is configured, the MAC entity shall:

1> if a MAC PDU is received in a configured downlink assignment:
  2> start the drx-HARQ-RTT-TimerDL for the corresponding HARQ process in the first symbol after the end of the corresponding transmission carrying the DL HARQ feedback;
  2> stop the drx-RetransmissionTimerDL for the corresponding HARQ process.
1> if a MAC PDU is transmitted in a configured uplink grant and LBT failure indication is not received from lower layers:
  2> start the drx-HARQ-RTT-TimerUL for the corresponding HARQ process in the first symbol after the end of the first repetition of the corresponding PUSCH transmission;
  2> stop the drx-RetransmissionTimerUL for the corresponding HARQ process.
1> if a drx-HARQ-RTT-TimerDL expires:
  2> if the data of the corresponding HARQ process was not successfully decoded:
    3> start the drx-RetransmissionTimerDL for the corresponding HARQ process in the first symbol after the expiry of drx-HARQ-RTT-TimerDL.
1> if a drx-HARQ-RTT-TimerUL expires:
  2> start the drx-RetransmissionTimerUL for the corresponding HARQ process in the first symbol after the expiry of drx-HARQ-RTT-TimerUL.
1> if a DRX Command MAC CE or a Long DRX Command MAC CE is received:
  2> stop drx-onDurationTimer for each DRX group;
  2> stop drx-InactivityTimer for each DRX group.
1> if drx-InactivityTimer for a DRX group expires:
  2> if the Short DRX cycle is configured:
    3> start or restart drx-ShortCycleTimer for this DRX group in the first symbol after the expiry of drx-InactivityTimer;
    3> use the Short DRX cycle for this DRX group.
  2> else:
    3> use the Long DRX cycle for this DRX group.
1> if a DRX Command MAC CE is received:
  2> if the Short DRX cycle is configured:
    3> start or restart drx-ShortCycleTimer for each DRX group in the first symbol after the end of DRX Command MAC CE reception;
    3> use the Short DRX cycle for each DRX group.
  2>: else
    3> use the Long DRX cycle for each DRX group.
1> if drx-ShortCycleTimer for a DRX group expires:
  2> use the Long DRX cycle for this DRX group.
1> if a Long DRX Command MAC CE is received:
  2> stop drx-ShortCycleTimer for each DRX group;
  2> use the Long DRX cycle for each DRX group.
1> if the Short DRX cycle is used for a DRX group, and [(SFN × 10) + subframe number] modulo (drx-ShortCycle) = (drx-StartOffset) modulo (drx-ShortCycle):
  2> start drx-onDurationTimer for this DRX group after drx-SlotOffset from the beginning of the subframe.
1> if the Long DRX cycle is used for a DRX group, and [(SFN × 10) + subframe number] modulo (drx-LongCycle) = drx-StartOffset:
  2> if DCP monitoring is configured for the active DL BWP as specified in TS 38.213 [6], clause 10.3:
    3> if DCP indication associated with the current DRX cycle received from lower layer indicated to start drx-onDurationTimer, as specified in TS 38.213 [6]; or
    3> if all DCP occasion(s) in time domain, as specified in TS 38.213 [6], associated with the current DRX cycle occurred in Active Time considering grants/assignments/DRX Command MAC CE/Long DRX Command MAC CE received and Scheduling Request sent until 4 ms prior to start of the last DCP occasion, or within BWP switching interruption length, or during a measurement gap, or when the MAC entity monitors for a PDCCH transmission on the search space indicated by recoverySearchSpaceId of the SpCell identified by the C-RNTI while the ra-ResponseWindow is running (as specified in clause 5.1.4); or
    3> if ps-Wakeup is configured with value true and DCP indication associated with the current DRX cycle has not been received from lower layers:
      4> start drx-onDurationTimer after drx-SlotOffset from the beginning of the subframe.
  2> else:
    3> start drx-onDurationTimer for this DRX group after drx-SlotOffset from the beginning of the subframe.

NOTE 2: In case of unaligned SFN across carriers in a cell group, the SFN of the SpCell is used to calculate the DRX duration.

1> if a DRX group is in Active Time:
  2> monitor the PDCCH on the Serving Cells in this DRX group as specified in TS 38.213 [6];
  2> if the PDCCH indicates a DL transmission:
    3> start the drx-HARQ-RTT-TimerDL for the corresponding HARQ process in the first symbol after the end of the corresponding transmission carrying the DL HARQ feedback;

TABLE 13-continued

3GPP TS 38.321 V16.2.1

NOTE 3: When HARQ feedback is postponed by PDSCH-to-HARQ_feedback timing indicating a non-numerical k1 value, as specified in TS 38.213 [6], the corresponding transmission opportunity to send the DL HARQ feedback is indicated in a later PDCCH requesting the HARQ-ACK feedback.
3> stop the drx-RetransmissionTimerDL for the corresponding HARQ process.
3> if the PDSCH-to-HARQ_feedback timing indicate a non-numerical k1 value as specified in TS 38.213 [6]:
4> start the drx-RetransmissionTimerDL in the first symbol after the PDSCH transmission for the corresponding HARQ process.
2> if the PDCCH indicates a UL transmission:
3> start the drx-HARQ-RTT-TimerUL for the corresponding HARQ process in the first symbol after the end of the first repetition of the corresponding PUSCH transmission;
3> stop the drx-RetransmissionTimerUL for the corresponding HARQ process.
2> if the PDCCH indicates a new transmission (DL or UL) on a Serving Cell in this DRX group:
3> start or restart drx-InactivityTimer for this DRX group in the first symbol after the end of the PDCCH reception.
2> if a HARQ process receives downlink feedback information and acknowledgement is indicated:
3> stop the drx-RetransmissionTimerUL for the corresponding HARQ process.
1> if DCP monitoring is configured for the active DL BWP as specified in TS 38.213 [6], clause 10.3; and
1> if the current symbol n occurs within drx-onDurationTimer duration; and
1> if drx-onDurationTimer associated with the current DRX cycle is not started as specified in this clause:
2> if the MAC entity would not be in Active Time considering grants/assignments/DRX Command MAC CE/Long DRX Command MAC CE received and Scheduling Request sent until 4 ms prior to symbol n when evaluating all DRX Active Time conditions as specified in this clause:
3> not transmit periodic SRS and semi-persistent SRS defined in TS 38.214 [7];
3> not report semi-persistent CSI configured on PUSCH;
3> if ps-TransmitPeriodicL1-RSRP is not configured with value true:
4> not report periodic CSI that is L1-RSRP on PUCCH.
3> if ps-TransmitOtherPeriodicCSI is not configured with value true:
4> not report periodic CSI that is not L1-RSRP on PUCCH.
1> else:
2> in current symbol n, if a DRX group would not be in Active Time considering grants/assignments scheduled on Serving Cell(s) in this DRX group and DRX Command MAC CE/Long DRX Command MAC CE received and Scheduling Request sent until 4 ms prior to symbol n when evaluating all DRX Active Time conditions as specified in this clause:
3> not transmit periodic SRS and semi-persistent SRS defined in TS 38.214 [7] in this DRX group;
3> not report CSI on PUCCH and semi-persistent CSI configured on PUSCH in this DRX group.
2> if CSI masking (csi-Mask) is setup by upper layers:
3> in current symbol n, if drx-onDurationTimer of a DRX group would not be running considering grants/assignments scheduled on Serving Cell(s) in this DRX group and DRX Command MAC CE/Long DRX Command MAC CE received until 4 ms prior to symbol n when evaluating all DRX Active Time conditions as specified in this clause; and
4> not report CSI on PUCCH in this DRX group.
NOTE 4: If a UE multiplexes a CSI configured on PUCCH with other overlapping UCI(s) according to the procedure specified in TS 38.213 [6] clause 9.2.5 and this CSI multiplexed with other UCI(s) would be reported on a PUCCH resource outside DRX Active Time of the DRX group in which this PUCCH is configured, it is up to UE implementation whether to report this CSI multiplexed with other UCI(s).
Regardless of whether the MAC entity is monitoring PDCCH or not on the Serving Cells in a DRX group, the MAC entity transmits HARQ feedback, aperiodic CSI on PUSCH, and aperiodic SRS defined in TS 38.214 [7] on the Serving Cells in the DRX group when such is expected.
The MAC entity needs not to monitor the PDCCH if it is not a complete PDCCH occasion (e.g. the Active Time starts or ends in the middle of a PDCCH occasion).

Methods/operations (i.e., operations related to DRX) according to embodiments to be described below may be performed in combination with existing defined DRX operation/method, or performed based on the existing defined DRX operation/method. For example, at least one of the existing DRX operations performed together in combination with the existing DRX operation, the SL DRX operation and/or the SL DRX operation may be performed based on the above-described DRX operation and Tables 12 and 13. For example, operation/configuration that is not separately defined or is not newly defined in SL DRX operation to be described below may be based on the above-described DRX operation and Tables 12 and 13. That is, the operation/configuration based on the above-described DRX operation and Tables 12 and 13 may be applied to the SL DRX operation/configuration.

In the present disclosure, a wording "configuration or definition" may be interpreted as being (pre-) configured from the base station or the network (via pre-defined signaling (e.g., SIB, MAC signaling, or RRC signaling). For example, "A may be configured" may include "the base station or network (pre-) configures/defines or announces A for the UE". Alternatively, the wording "configuration or definition" may be interpreted as being pre-configured or defined by a system. For example, "A may be configured" may include "A is pre-configured/defined by the system".

In Release 17 NR V2X, SideLink Discontinuous Reception (SL DRX) operation is supported. Embodiment(s) of the present disclosure proposes an SL DRX operation of a sidelink resource pool (resource pool) based UE. In the following description, the expression of "when, if, in case of" may be replaced by the expression of "based on".

The present disclosure proposes a sidelink resource pool based SL DRX operation of a Tx UE and an Rx UE, as below.

The sidelink resource pool may be configured with a resource pool supporting the SL DRX operation and a resource pool not supporting the SL DRX operation. This is described in detail below with reference to FIG. 13.

FIG. 13 illustrates an example of a resource pool for sidelink communication according to an embodiment of the present disclosure.

A UE may be assumed to be configured with two SL resource pools. For example, a sidelink resource pool "A" and a sidelink resource pool "B" may be configured as a resource pool (e.g., RX pool) used by an Rx UE. The sidelink resource pool "A" may be a resource pool supporting an SL DRX operation, and the sidelink resource pool "B" may be a resource pool not supporting the SL DRX operation.

Referring to FIG. 13, the sidelink resource pool "A" may include eight SL slots (logical indexes 1 to 8) within the range of physical slot indexes 1 to 15. The eight SL slots may be SL slots based on the physical slot indexes 1, 3, 5, 7, 9, 11, 13, and 15. The sidelink resource pool "B" may include four SL slots (logical indexes 1 to 4) within the range of physical slot indexes 1 to 15. The four SL slots may be SL slots based on the physical slot index 2, 6, 10, and 14. The physical slot index refers to an index to identify temporally consecutive physical slots, and the logical slot index refers to an index to identify slots (i.e., SL slots) configured/allocated for sidelink communication. FIG. 13 illustrates that the SL slots are discontinuously configured at the time axis, but the SL slots may be configured based on the consecutive physical slots. The above-described sidelink resource pool may be pre-configured or configured by a base station.

For example, configuration information for the sidelink resource pool may be based on information configured in UE implementation. For example, the UE may receive the configuration information for the sidelink resource pool from the base station. The configuration information for the sidelink resource pool may be received via higher layer signaling (e.g., RRC signaling).

Based on the above-described sidelink resource pool, an SL DRX operation of the UE is described in detail below.

An Rx UE may receive SL data based on monitoring for a sidelink resource pool ("A" and "B").

It may be determined that the Rx UE performs an SL DRX operation using the sidelink resource pool "A" based on a specific condition. For example, the specific condition may be defined based on an indication of a BS/Tx UE. For example, based on the specific condition being met, the Rx UE may be defined/configured to select/use a specific resource pool (e.g., the sidelink resource pool "A").

In this instance, the Rx UE may perform the SL DRX operation as follows.

For example, if the Rx UE receives PSCCH/PSSCH (i.e., first stage SCI transmitted on the PSCCH and second stage SCI transmitted on the PSSCH) transmitted by the Tx UE in SL slot "N" (SL slot included in the sidelink resource pool "A"), the Rx UE starts an SL DRX inactivity timer and extends a time duration (time period) in which an active time operation can be performed. In other words, based on the first stage SCI and the second stage SCI being received in the SL slot "N", the SL DRX inactivity timer runs. A time duration in which the SL DRX inactivity timer is running is active time.

According to an embodiment, based on SL slots belonging to the sidelink resource pool "B" being included in an SL DRX inactivity timer duration, an inactive time (sidelink sleep mode) operation may be performed in the SL slots belonging to the sidelink resource pool "B". The operation according to the present embodiment can also be equally applied to an operation based on an SL retransmission timer.

According to an embodiment, the Rx UE may perform the SL DRX operation using configured SL DRX configuration (SL DRX configuration configured by the Tx UE or SL DRX configuration configured per QoS profile).

For example, the Rx UE may apply an On Duration timer of the configured SL DRX configuration to perform an SL DRX active time operation. The Rx UE may perform the SL DRX active time operation while the On Duration timer is running. In this instance, the SL DRX active time operation may be performed based on a resource pool including an SL slot included in a time duration in which the On Duration timer is running. This is described in detail below.

The Rx UE may perform an active time (active mode) operation in SL slots of the sidelink resource pool "A" (a resource pool in which the SL DRX operation is supported) in a sidelink DRX On Duration timer duration. The Rx UE may perform an inactive time (sleep mode) operation in SL slots of the sidelink resource pool "B" (a resource pool in which the SL DRX operation is not supported) in the sidelink DRX On Duration timer duration. The sidelink DRX On Duration timer duration may refer to a time duration in which a sidelink DRX On Duration timer is running.

In relation to the SL DRX operation, the following embodiment may be considered. The Rx UE may receive the SL data based on the monitoring for the sidelink resource pool (resource pools "A" and "B" and "C") configured by the base station. In this instance, the sidelink resource pool may be configured as follows.

Resource pool "A": Resource pool in which sidelink operation is supported

Resource pool "B": Resource pool in which sidelink operation is not supported

Resource pool "C": Resource pool in which sidelink operation is supported

It may be determined that the Rx UE performs the SL DRX operation using the sidelink resource pool "A" based on a specific condition. For example, the specific condition may be defined based on an indication of the BS/Tx UE. For example, based on the specific condition being met, the Rx UE may be defined/configured to select/use a specific resource pool (e.g., the sidelink resource pool "A").

In this instance, the Rx UE may perform the SL DRX operation as follows.

For example, if the Rx UE receives PSCCH/PSSCH (i.e., first stage SCI transmitted on the PSCCH and second stage SCI transmitted on the PSSCH) transmitted by the Tx UE in SL slot "N" (SL slot included in the sidelink resource pool "A"), the Rx UE starts an SL DRX inactivity timer and extends a time duration in which an active time operation can be performed. In other words, based on the first stage SCI and the second stage SCI being received in the SL slot "N", the SL DRX inactivity timer runs. A time duration in which the SL DRX inactivity timer is running is active time.

According to an embodiment, based on SL slots belonging to the sidelink resource pool "B" or "C" being included in an SL DRX inactivity timer duration, the Rx UE may perform an inactive time (sidelink sleep mode) operation in the SL slots belonging to the sidelink resource pool "B" (a resource pool in which the SL DRX operation is not supported) or the sidelink resource pool "C" (a resource pool in which the SL DRX operation is supported, but which is not selected by the Rx UE for the DRX operation). The operation according to the present embodiment can also be equally applied to an operation based on an SL retransmission timer.

According to an embodiment, the Rx UE may perform the SL DRX operation using configured SL DRX configuration (SL DRX configuration configured by the Tx UE or SL DRX configuration configured per QoS profile).

For example, the Rx UE may apply an On Duration timer of the configured SL DRX configuration to perform an SL DRX active time operation. The Rx UE may perform the SL DRX active time operation while the On Duration timer is running. In this instance, the SL DRX active time operation may be performed based on a resource pool including an SL slot included in a time duration in which the On Duration timer is running. This is described in detail below.

The Rx UE may perform an active time (active mode) operation in SL slots of the sidelink resource pool "A" (a resource pool in which the SL DRX operation is supported) in a sidelink DRX On Duration timer duration. The Rx UE may perform an inactive time (sleep mode) operation in SL slots of the sidelink resource pool "B" (a resource pool in which the SL DRX operation is not supported) or the sidelink resource pool "C" (a resource pool in which the SL DRX operation is supported, but which is not selected by the Rx UE for the DRX operation).

The above-described operation based on the embodiment of the present disclosure can be applied to all sidelink unicast/groupcast/broadcast operations.

The sidelink DRX configuration may include information on at least one of the following parameters.

Sidelink DRX Configurations

- SL drx-onDurationTimer: the duration at the beginning of a SL DRX Cycle;
- SL drx-SlotOffset: the delay before starting the sl drx-onDurationTimer;
- SL drx-Inactivity Timer: the duration after the PSCCH occasion in which a PSCCH indicates a new SL transmission for the MAC entity;
- SL drx-StartOffset: the subframe where the SL DRX cycle start;
- SL drx-Cycle: the SL DRX cycle;
- SL drx-HARQ-RTT-Timer (per HARQ process or per sidelink process): the minimum duration before an assignment for HARQ retransmission is expected by the MAC entity.
- SL drx-RetransmissionTimer (per HARQ process or per sidelink process): the maximum duration until a retransmission is received.

The UE may receive the sidelink DRX configuration from the base station via higher layer signaling (e.g., RRC signaling). For example, the sidelink DRX configuration may be received based on an RRC message (e.g., SL-DRX-Config). The sidelink DRX configuration may be defined/configured per cast type related to sidelink communication (e.g., SL-DRX-Config-GC-BC, SL-DRX-ConfigUC). For example, a timer (e.g. onDurationTimer, Inactivity Timer, HARQ-RTT-Timer, RetransmissionTimer) based on the above-described sidelink DRX configuration may include a timer for unicast and a timer for group cast (GC)/broadcast (BC).

A sidelink DRX timer based on the sidelink DRX configuration may be used for the following purposes.

Sidelink DRX Onduration Timer: Based on this Timer, a time duration, in which a UE performing a sidelink DRX operation shall basically operate in active time to receive PSCCH/PSSCH (first stage SCI/second stage SCI) of other UE, is defined. That is, a time duration in which the Sidelink DRX Onduration Timer is running is an active time related to SL DRX.

Sidelink DRX Inactivity Timer: Based on this Timer, Sidelink DRX Onduration period, which is a time period in which the UE performing the sidelink DRX operation shall basically operate in active time to receive the PSCCH/PSSCH (first stage SCI/second stage SCI) of the other UE, is extended. That is, the Sidelink DRX Onduration period may be extended as much as Sidelink DRX Inactivity Timer period (i.e., a time period in which the Sidelink DRX Inactivity Timer is running). That is, the time period in which the Sidelink DRX Inactivity Timer is running is the active time related to SL DRX. In addition, if the UE receives a new packet (new PSSCH transmission) from the other UE, the UE may start the Sidelink DRX Inactivity Timer and extend the Sidelink DRX Onduration timer period.

Sidelink DRX HARQ RTT Timer: Based on this Timer, a time duration, in which the UE performing the sidelink DRX operation operates in a sleep mode until receiving a retransmission packet (or PSSCH assignment) transmitted by the other UE, is defined. That is, if the UE starts Sidelink DRX HARQ RTT Timer, the UE determines that the other UE will not transmit a sidelink retransmission packet to itself until the Sidelink DRX HARQ RTT Timer expires, and operates in the sleep mode during the corresponding timer (while the timer is running). That is, a time duration in which the Sidelink DRX HARQ RTT Timer is running is an inactive time related to SL DRX.

Sidelink DRX Retransmission Timer: Based on this Timer, a time duration in which the UE performing the sidelink DRX operation operates in active time to receive the retransmission packet (or PSSCH assignment) transmitted by the other UE is defined. That is, a time duration in which the Sidelink DRX Retransmission Timer is running is an active time related to SL DRX. During the corresponding timer time duration (while the timer is running), the UE monitors a retransmission sidelink packet (or PSSCH assignment) transmitted by the other UE.

An Uu DRX timer below may be used for the following purposes. Here, Uu DRX means the existing DRX. That is, the existing supported DRX may be referred to as the Uu DRX, and DRX newly introduced for sidelink communication in Rel-17 may be referred to as SL DRX.

drx-HARQ-RTT-TimerSL Timer: Based on this Timer, a time duration, in which the Tx UE (UE supporting Uu DRX operation) performing the sidelink communication based on sidelink resource allocation mode 1 does not monitor the PDCCH (or DCI) for sidelink mode 1 resource allocation transmitted by the base station, is defined. That is, a time duration in which the drx-HARQ-RTT-TimerSL Timer is running is an inactive time related to the Uu DRX.

drx-RetransmissionTimerSL Timer: Based on this Timer, a time duration, in which the Tx UE (UE supporting the Uu DRX operation) performing the sidelink communication based on the sidelink resource allocation mode 1 monitors the PDCCH (or DCI) for the sidelink mode 1 resource allocation transmitted by the base station, is defined. That is, a time duration in which the drx-RetransmissionTimerSL Timer is running is an active time related to the Uu DRX.

In the present disclosure, the names of the timers (Sidelink DRX Onduration Timer, Sidelink DRX Inactivity Timer, Sidelink DRX HARQ RTT Timer, Sidelink DRX Retransmission Timer, etc.) are merely an example, and timers performing the same/similar functions based on the content described for each timer may be considered as the same/similar timers regardless of their names.

The above-described embodiment(s) of the present disclosure can be applied and extended as a method of solving a problem of loss due to interruption occurring during Uu bandwidth part (BWP) switching.

The above-described embodiment(s) of the present disclosure can be applied and extended as a method of solving a problem of loss due to interruption occurring during sidelink bandwidth part (BWP) switching when the UE supports sidelink multiple bandwidth part (BWP).

The above-described embodiment(s) of the present disclosure can be applied to parameters (and timers) included in default/common Sidelink DRX configuration, or default/common Sidelink DRX pattern, or default/common Sidelink DRX configuration. The above-described embodiment(s) of the present disclosure can also be extended and applied to parameters (and timers) included in UE-pair specific Sidelink DRX configuration, or UE-pair specific Sidelink DRX pattern, or UE-pair specific Sidelink DRX configuration.

The definition of terms related to the embodiments of the present disclosure may be interpreted/applied as follows.

The term "Onduration" may be interpreted/applied as a duration of the active time (a time duration in which it operates in a wake up state (RF module is "On") to receive/transmit a radio signal).

The term "Offduration" may be interpreted/applied as a time duration of the sleep time (a time duration in which it operates in a sleep mode state (RF module is "Off") for power saving). In this instance, it does not mean that the transmitting UE shall compulsorily operate in the sleep mode in a sleep time duration. If necessary, even in the sleep time, the UE may operate in the active time for a while for sensing operation/transmission operation.

The above-described embodiment(s) of the present disclosure may be differently performed/applied based on at least one of the following 1) to 6).

1) Resource pool
2) Congestion level
3) Service priority (and/or type)
4) QoS requirements (e.g., latency, reliability) or PQI (PC5 quality indicator)
5) Traffic type (e.g., (a) periodic generation)
6) Sidelink transmission resource allocation mode (mode 1, mode 2)

For example, whether to perform the above-described SL DRX related operation may be determined based on at least one of the 1) to 6).

For example, application of rules/parameters related to the above-described SL DRX operation may be applied differently based on at least one of the 1) to 6).

For example, an embodiment of the present disclosure (and/or a related parameter setting value) may be configured to be applied based on conditions based on at least one of predefined components being met. Specifically, an embodiment of the present disclosure may be configured to be applied based on conditions consisting of at least one of components listed below being met.

For a resource pool, service/packet type (and/or priority), QOS requirements (e.g., URLLC/EMBB traffic, reliability, latency), PQI, PC5 QOS Flow Identifier (PFI), cast type (e.g. unicast, groupcast, broadcast), (resource pool) congestion level (e.g. CBR), SL HARQ feedback scheme (e.g., NACK Only Feedback, ACK/NACK Feedback), transmission of HARQ Feedback Enabled MAC PDU (and/or HARQ Feedback Disabled MAC PDU), whether to configure PUCCH based SL HARQ feedback reporting operation, in the case of performing pre-emption (and/or Re-Evaluation) (or reselection of resources), (L2 or L1) (Source and/or Destination) identifier, (L2 or L1) (combination of source layer ID and destination layer ID) identifier, (L2 or L1) (combination of a pair of Source layer ID and Destination layer ID and Cast type) identifier, direction of a pair of Source layer ID and Destination layer ID, PC5 RRC Connection/Link, in case of performing SL DRX, SL mode type (resource allocation mode 1, resource allocation mode 2), in case of (a) periodic resource reservation The "time duration" (related to the active time) mentioned in the proposal of the present disclosure may refer to 1) a time operating as Active Time as much as predefined time for the UE to receive sidelink signals or sidelink data from the other UE or 2) a time operating as Active Time as much as the time of a specific timer (Sidelink DRX Retransmission Timer, or Sidelink DRX Inactivity Timer, or a timer that guarantees that the DRX operation of the Rx UE can operate in Active Time).

Embodiments of the present disclosure and whether to apply the embodiments (and/or related parameter setting values) can also be applied to mmWave Sidelink operation.

Various embodiments of the present disclosure can be mutually combined.

From an implementation perspective, operations (e.g., operations related to the SL DRX) of the Rx UE/Tx UE according to the above-described embodiments may be processed by a device (e.g., processors 102 and 202 of FIG. 17) of FIGS. 16 to 21 to be described later.

Further, operations (e.g., operations related to the SL DRX) of the Rx UE/Tx UE according to the above-described embodiments may be stored in a memory (e.g., memories 104 and 204 of FIG. 17) in the form of commands/programs (e.g., instructions, executable codes) for running at least one processor (e.g., processors 102 and 202 of FIG. 17).

Below, the above-described embodiments are described in detail from a perspective of an operation of the second UE with reference to FIG. 14. Methods to be described below are merely distinguished for convenience of explanation. Thus, as long as the methods are not mutually exclusive, it is obvious that partial configuration of any method can be substituted or combined with partial configuration of another method.

FIG. 14 is a flowchart illustrating a method for a second UE to receive sidelink data in a wireless communication system according to an embodiment of the present disclosure.

Referring to FIG. 14, a method for a second UE to receive sidelink data in a wireless communication system according to an embodiment of the present disclosure comprises a step S1410 of receiving configuration information related to an SL resource pool, a step S1420 of receiving sidelink control information, and a step S1430 of receiving sidelink data.

In the following description, a first UE may mean a Tx UE related to the above-described SL DRX (e.g., the first UE of FIG. 6), and the second UE may mean an Rx UE related to the above-described SL DRX (e.g., the second UE of FIG. 6).

In the step S1410, the second UE receives configuration information related to a resource pool for sidelink communication from a base station (BS). The configuration information related to the resource pool for sidelink communication may mean configuration information for the above-described sidelink resource pool. The configuration information may include information for a Tx resource pool and/or an Rx resource pool for sidelink communication. For example, the configuration information may include information for at least one of i) a resource pool in which the SL DRX is supported and/or ii) a resource pool in which the SL DRX is not supported.

According to the step S1410, an operation of the second UE (100/200 of FIGS. 16 to 21) to receive the configuration information related to the resource pool for sidelink communication from the base station (100/200 of FIGS. 16 to 21) may be implemented by a device of FIGS. 16 to 21. For example, referring to FIG. 17, one or more processors 102 may control one or more transceivers 106 and/or one or more memories 104 so as to receive the configuration information related to the resource pool for sidelink communication from the base station 200.

In the step S1420, the second UE receives sidelink control information (SCI) from the first UE. The SCI may include a first stage SCI received on a physical sidelink control channel (PSCCH) and a second stage SCI received on a physical sidelink shared channel (PSSCH). In this instance, the SCI may be related to resource allocation mode 1 ((a) of FIG. 6) or resource allocation mode 2 ((b) of FIG. 6).

According to an embodiment, the SCI may be received based on a monitoring related to the SCI. The monitoring related to the SCI may be performed in an active time related to the SL DRX or performed regardless of the active time related to the SL DRX.

For example, an SL DRX cycle may be started after an SL drx cycle start slot offset (the above-described SL drx-StartOffset) from a beginning of a subframe based on SL DRX configuration of the second UE. An SL DRX OnDuration timer starts after an SL drx slot offset (the above-described SL drx-SlotOffset) from a beginning of the SL DRX cycle. The SCI may be received based on SCI monitoring performed within a time duration in which the SL DRX OnDuration timer is running.

For example, the SCI may be received in a time duration other than the active time related to the SL DRX. As a specific example, it may mean a case where an SL DRX HARQ RTT timer related to the SL DRX is running, but a slot within the time duration belongs to a resource pool that does not support the SL DRX.

In the following description, slots within a time duration in which a timer (e.g., SL DRX OnDuration timer, SL DRX Inactivity timer, SL DRX HARQ RTT Timer, SL DRX Retransmission Timer) based on the SL DRX configuration is running may include a first slot and/or a second slot. The first slot may be a slot belonging to a resource pool in which the SL DRX is not supported. The second slot may be a slot belonging to a resource pool in which the SL DRX is supported. In this instance, the second UE may not perform an operation related to the SL DRX in the first slot. The second UE may perform an operation (active time operation, sleep mode operation, running of other SL DRX timers) related to the SL DRX in the second slot.

According to an embodiment, based on a slot in which the SCI is received, an active time related to sidelink (SL) discontinuous reception (DRX) may be determined. Based on a resource pool including the slot in which the SCI is received, whether to perform an operation related to the SL DRX may be determined.

It may be assumed that the slot in which the SCI is received is the second slot. Specifically, based on the resource pool including the slot in which the SCI is received being the resource pool in which the SL DRX is supported, the operation related to the SL DRX may be performed. For example, the monitoring related to the SCI may be performed only for the active time related to the SL DRX. For example, a timer (e.g., one of SL DRX OnDuration timer, SL DRX Inactivity timer, SL DRX HARQ RTT timer, and/or SL DRX Retransmission timer) related to the SL DRX may be started.

According to an embodiment, the active time related to the SL DRX may include a time duration in which a pre-configured SL DRX timer is running. The pre-configured SL DRX timer may include at least one of i) SL DRX Onduration timer, ii) SL DRX inactivity timer, and/or iii) SL DRX retransmission timer.

According to the step S1420, an operation of the second UE (100/200 of FIGS. 16 to 21) to receive the sidelink control information (SCI) from the first UE (100/200 of FIGS. 16 to 21) may be implemented by the device of FIGS. 16 to 21. For example, referring to FIG. 17, one or more processors 102 may control one or more transceivers 106 and/or one or more memories 104 so as to receive the SCI from the first UE 200.

In the step S1430, the second UE receives, from the first UE, sidelink data based on the SCI.

According to an embodiment, based on i) the resource pool including the slot in which the SCI is received being the resource pool in which the SL DRX is supported, and ii) a transmission of the sidelink data scheduled by the SCI being a new sidelink transmission, the SL DRX inactivity timer may be started after the slot in which the SCI is received. The active time (based on a running duration of the SL DRX OnDuration timer) may be extended by a time duration in which the SL DRX inactivity timer is running.

The new sidelink transmission may mean an initial transmission not retransmission.

In relation to a retransmission of the sidelink data, the SL DRX HARQ RTT timer may be started. In this instance, SCI monitoring may or may not be performed within a time duration in which the SL DRX HARQ RTT timer is running. This is described in detail below.

For the sidelink communication with a UE that does not support the SL DRX, it may be configured so that the SL DRX operation is not performed in the first slot. According to an embodiment, based on i) the SL DRX HARQ RTT timer related to the retransmission of the sidelink data being started, and ii) the first slot within a time duration, in which the SL DRX HARQ RTT timer is running, belonging to a resource pool in which the SL DRX is not supported, the monitoring related to the SCI may be performed in the first slot.

To reduce UE power consumption, it may be configured so that the SL DRX operation is performed in the second slot. According to an embodiment, based on i) the SL DRX HARQ RTT timer related to the retransmission of the sidelink data being started, and ii) the second slot within a time duration, in which the SL DRX HARQ RTT timer is running, belonging to a resource pool in which the SL DRX is supported, monitoring related to the SCI for the data reception may be skipped in the second slot. That is, the monitoring related to the first stage SCI for a sensing operation may be performed in the second slot, but the monitoring related to the second stage SCI for the data reception may be skipped in the second slot. The first stage SCI is transmitted on a physical sidelink control channel (PSCCH), and the second stage SCI is transmitted on a physical sidelink shared channel (PSSCH).

According to an embodiment, based on the resource pool including the slot in which the SCI is received being the resource pool in which the SL DRX is not supported, the operation related to the SL DRX may not be performed.

According to the step S1430, an operation of the second UE (100/200 of FIGS. 16 to 21) to receive the sidelink data from the first UE (100/200 of FIGS. 16 to 21) based on the SCI may be implemented by the device of FIGS. 16 to 21. For example, referring to FIG. 17, one or more processors

102 may control one or more transceivers 106 and/or one or more memories 104 so as to receive the sidelink data from the first UE 200 based on the SCI.

The method may further comprise a step of receiving SL DRX configuration information. In the step of receiving the SL DRX configuration information, the second UE receives the SL DRX configuration information from the base station. The SL DRX configuration information may include information for the pre-configured SL DRX timer. The SL DRX configuration information may include information for at least one of the SL DRX OnDuration timer, the SL DRX inactivity timer, the SL DRX HARQ RTT timer, and/or the SL DRX retransmission timer. The step of receiving the SL DRX configuration information may be performed before the step S1410 or before the step S1420.

According to the above-described step, an operation of the second UE (100/200 of FIGS. 16 to 21) to receive the SL DRX configuration information from the base station (100/200 of FIGS. 16 to 21) may be implemented by the device of FIGS. 16 to 21. For example, referring to FIG. 17, one or more processors 102 may control one or more transceivers 106 and/or one or more memories 104 so as to receive the SL DRX configuration information from the base station 200.

Below, the above-described embodiments are described in detail from a perspective of an operation of the first UE with reference to FIG. 15. Methods to be described below are merely distinguished for convenience of explanation. Thus, as long as the methods are not mutually exclusive, it is obvious that partial configuration of any method can be substituted or combined with partial configuration of another method.

FIG. 15 is a flowchart illustrating a method for a first UE to transmit sidelink data in a wireless communication system according to another embodiment of the present disclosure.

Referring to FIG. 15, a method for a first UE to transmit sidelink data in a wireless communication system according to another embodiment of the present disclosure comprises a step S1510 of receiving configuration information related to an SL resource pool, a step S1520 of transmitting sidelink control information, and a step S1530 of transmitting sidelink data.

In the following description, the first UE may mean a Tx UE related to the above-described SL DRX (e.g., the first UE of FIG. 6), and a second UE may mean an Rx UE related to the above-described SL DRX (e.g., the second UE of FIG. 6).

In the step S1510, the first UE receives configuration information related to a resource pool for sidelink communication from a base station (BS). The configuration information related to the resource pool for sidelink communication may mean configuration information for the above-described sidelink resource pool. The configuration information may include information for a Tx resource pool and/or an Rx resource pool for sidelink communication. For example, the configuration information may include information for at least one of i) a resource pool in which the SL DRX is supported and/or ii) a resource pool in which the SL DRX is not supported.

According to the step S1510, an operation of the first UE (100/200 of FIGS. 16 to 21) to receive the configuration information related to the resource pool for sidelink communication from the base station (100/200 of FIGS. 16 to 21) may be implemented by a device of FIGS. 16 to 21. For example, referring to FIG. 17, one or more processors 202 may control one or more transceivers 206 and/or one or more memories 204 so as to receive the configuration information related to the resource pool for sidelink communication from the base station 100.

In the step S1520, the first UE transmits sidelink control information (SCI) to the second UE. The SCI may include a first stage SCI transmitted on a physical sidelink control channel (PSCCH) and a second stage SCI transmitted on a physical sidelink shared channel (PSSCH). In this instance, the SCI may be related to resource allocation mode 1 ((a) of FIG. 6) or resource allocation mode 2 ((b) of FIG. 6).

According to an embodiment, the SCI may be transmitted in a time duration in which a monitoring related to the SCI (by the second UE) is performed. The time duration in which a monitoring related to the SCI is performed may be an active time related to the SL DRX or time duration regardless of the active time related to the SL DRX.

For example, an SL DRX cycle may be started after an SL drx cycle start slot offset (the above-described SL drx-StartOffset) from a beginning of a subframe based on SL DRX configuration of the second UE. An SL DRX OnDuration timer starts after an SL drx slot offset (the above-described SL drx-SlotOffset) from a beginning of the SL DRX cycle. The SCI may be transmitted within a time duration in which the SL DRX OnDuration timer is running.

For example, the SCI may be transmitted in a time duration other than the active time related to the SL DRX. As a specific example, it may be assumed that an SL DRX HARQ RTT timer related to the SL DRX is running, but a slot within the time duration belongs to a resource pool that does not support the SL DRX. The SCI may be transmitted in the slot within the time duration.

In the following description, slots within a time duration in which a timer (e.g., SL DRX OnDuration timer, SL DRX Inactivity timer, SL DRX HARQ RTT Timer, SL DRX Retransmission Timer) based on the SL DRX configuration of the second UE is running may include a first slot and/or a second slot. The first slot may be a slot belonging to a resource pool in which the SL DRX is not supported. The second slot may be a slot belonging to a resource pool in which the SL DRX is supported. In this instance, the second UE may not perform an operation related to the SL DRX in the first slot. That is, the first UE may transmit the SCI in the first slot. The second UE may perform an operation (active time operation, sleep mode operation, running of other SL DRX timers) related to the SL DRX in the second slot. That is, the first UE may transmit the SCI in the active time determined based on the operation related to the SL DRX.

According to an embodiment, based on a slot in which the SCI is transmitted, an active time related to sidelink (SL) discontinuous reception (DRX) of the second UE may be determined. Based on a resource pool including the slot in which the SCI is transmitted, whether to perform an operation related to the SL DRX of the second UE may be determined.

It may be assumed that the slot in which the SCI is transmitted is the second slot. Specifically, based on the resource pool including the slot in which the SCI is transmitted being the resource pool in which the SL DRX is supported, the operation related to the SL DRX of the second UE may be performed. For example, the monitoring related to the SCI of the second UE may be performed only for the active time related to the SL DRX. For example, a timer (e.g., one of SL DRX OnDuration timer, SL DRX Inactivity timer, SL DRX HARQ RTT timer, and/or SL DRX Retransmission timer) related to the SL DRX of the second UE may be started. Based on the above-described operation of the second UE, the first UE may transmit the SCI within the active time related to the SL DRX.

According to an embodiment, the active time related to the SL DRX may include a time duration in which a pre-configured SL DRX timer is running. The pre-configured SL DRX timer may include at least one of i) SL DRX Onduration timer, ii) SL DRX inactivity timer, and/or iii) SL DRX retransmission timer.

According to the step S1520, an operation of the first UE (100/200 of FIGS. 16 to 21) to transmit the sidelink control information (SCI) to the second UE (100/200 of FIGS. 16 to 21) may be implemented by the device of FIGS. 16 to 21. For example, referring to FIG. 17, one or more processors 202 may control one or more transceivers 206 and/or one or more memories 204 so as to transmit the SCI to the second UE 100.

In the step S1530, the first UE transmits, to the second UE, sidelink data based on the SCI.

According to an embodiment, based on i) the resource pool including the slot in which the SCI is transmitted being the resource pool in which the SL DRX is supported, and ii) a transmission of the sidelink data scheduled by the SCI being a new sidelink transmission, the SL DRX inactivity timer of the second UE may be started after the slot in which the SCI is transmitted. The active time (based on a running duration of the SL DRX OnDuration timer) may be extended by a time duration in which the SL DRX inactivity timer is running. The first UE may transmit the SCI for (re) transmission of the sidelink data to the second UE in the time duration in which the SL DRX inactivity timer is running.

The new sidelink transmission may mean an initial transmission not retransmission.

In relation to a retransmission of the sidelink data, the SL DRX HARQ RTT timer of the second UE may be started. In this instance, SCI monitoring of the second UE may or may not be performed within a time duration in which the SL DRX HARQ RTT timer is running. This is described in detail below.

For the sidelink communication with a UE that does not support the SL DRX, it may be configured so that the SL DRX operation of the second UE is not performed in the first slot. According to an embodiment, based on i) the SL DRX HARQ RTT timer (of the second UE) related to the retransmission of the sidelink data being started, and ii) the first slot within a time duration, in which the SL DRX HARQ RTT timer is running, belonging to a resource pool in which the SL DRX is not supported, the monitoring related to the SCI may be performed in the first slot. That is, the first UE may transmit the SCI for (re) transmission of the sidelink data to the second UE in the first slot.

To reduce UE power consumption, it may be configured so that the SL DRX operation of the second UE is performed in the second slot. According to an embodiment, based on i) the SL DRX HARQ RTT timer (of the second UE) related to the retransmission of the sidelink data being started, and ii) the second slot within a time duration, in which the SL DRX HARQ RTT timer is running, belonging to a resource pool in which the SL DRX is supported, monitoring related to the SCI for the data reception may be skipped in the second slot. That is, the monitoring related to the first stage SCI for a sensing operation may be performed in the second slot, but the monitoring related to the second stage SCI for the data reception may be skipped in the second slot. The first stage SCI is transmitted on a physical sidelink control channel (PSCCH), and the second stage SCI is transmitted on a physical sidelink shared channel (PSSCH). The second UE operates in a sleep mode in the second slot and cannot receive the SCI, and the first UE may not transmit the SCI (e.g., the first/second stage SCI or the second stage SCI) for (re) transmission of the sidelink data to the second UE in the second slot.

According to an embodiment, based on the resource pool including the slot in which the SCI is transmitted being the resource pool in which the SL DRX is not supported, the operation related to the SL DRX of the second UE may not be performed.

According to the step S1530, an operation of the first UE (100/200 of FIGS. 16 to 21) to transmit the sidelink data to the second UE (100/200 of FIGS. 16 to 21) based on the SCI may be implemented by the device of FIGS. 16 to 21. For example, referring to FIG. 17, one or more processors 202 may control one or more transceivers 206 and/or one or more memories 204 so as to transmit the sidelink data to the second UE 100 based on the SCI.

The SL DRX operation of the second UE may be performed based on the SL DRX configuration information. The SL DRX configuration information may include information for the pre-configured SL DRX timer. The SL DRX configuration information may include information for at least one of the SL DRX OnDuration timer, the SL DRX inactivity timer, the SL DRX HARQ RTT timer, and/or the SL DRX retransmission timer.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 16 shows a communication system 1 based on an embodiment of the present disclosure.

Referring to FIG. 16, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot **100*a*, vehicles 100*b*-1 and 100*b*-2, an extended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200***a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various Is signal processing processes (e.g., channel encoding/decoding, modulation/demodulation, and resource mapping/demapping), and resource allocating processes, for transmitting/receiving radio signals, may be performed based on the various proposals of the present disclosure.

FIG. 17 shows wireless devices based on an embodiment of the present disclosure.

Referring to FIG. 17, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 16.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) based on the descriptions, functions, procedures, proposals, methods, and/or operational flowcharts disclosed in this document. The one or more processors 102 and 202 may generate messages, control information, data, or information based on the descriptions, functions, procedures, proposals, methods, and/or operational flowcharts disclosed in this document. The one or more processors 102 and 202 may generate signals (e.g., baseband signals) including PDUs, SDUs, messages, control information, data, or information based on the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information based on the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

FIG. 18 shows a signal process circuit for a transmission signal based on an embodiment of the present disclosure.

Referring to FIG. 18, a signal processing circuit 1000 may include scramblers 1010, modulators 1020, a layer mapper 1030, a precoder 1040, resource mappers 1050, and signal generators 1060. An operation/function of FIG. 18 may be performed, without being limited to, the processors 102 and 202 and/or the transceivers 106 and 206 of FIG. 17. Hardware elements of FIG. 18 may be implemented by the processors 102 and 202 and/or the transceivers 106 and 206 of FIG. 17. For example, blocks 1010 to 1060 may be implemented by the processors 102 and 202 of FIG. 17. Alternatively, the blocks 1010 to 1050 may be implemented by the processors 102 and 202 of FIG. 17 and the block 1060 may be implemented by the transceivers 106 and 206 of FIG. 17.

Codewords may be converted into radio signals via the signal processing circuit 1000 of FIG. 18. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 18. For example, the wireless devices (e.g., 100 and 200 of FIG. 17) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

FIG. 19 shows another example of a wireless device based on an embodiment of the present disclosure. The wireless device may be implemented in various forms based on a use-case/service (refer to FIG. 16).

Referring to FIG. 19, wireless devices 100 and 200 may correspond to the wireless devices 100 and 200 of FIG. 17 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 17. For example, the transceiver(s) 114 may include the one or more transceivers 106 and 206 and/or the one or more antennas 108 and 208 of FIG. 17. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured based on types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 16), the vehicles (100*b*-1 and 100*b*-2 of FIG. 16), the XR device (100*c* of FIG. 16), the hand-held device (100*d* of FIG. 16), the home appliance (100*e* of FIG. 16), the IoT device (100*f* of FIG. 16), a digital broadcast terminal, a hologram device, a public safety device, an MTC device, a medicine device, a fintech device (or a finance device), a security device, a climate/environment device, the AI server/device (400 of FIG. 16), the BSs (200 of FIG. 16), a network node, etc. The wireless device may be used in a mobile or fixed place based on a use-example/service.

In FIG. 19, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 19 will be described in detail with reference to the drawings.

FIG. 20 shows a hand-held device based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 20, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 19, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

FIG. 21 shows a vehicle or an autonomous vehicle based on an embodiment of the present disclosure. The vehicle or autonomous vehicle may be implemented by a mobile robot, a car, a train, a manned/unmanned Aerial Vehicle (AV), a ship, etc.

Referring to FIG. 21, a vehicle or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 19, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path based on the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims described in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

The invention claimed is:

1. A method comprising:

receiving, by a second user equipment (UE) from a base station, sidelink (SL) discontinuous reception (DRX) configuration information, wherein the SL DRX configuration information includes information for a plurality of SL DRX timers that include i) an SL DRX Hybrid Automatic Repeat Request (HARQ) Round Trip Time (RTT) timer, ii) an SL DRX Onduration timer, iii) an SL DRX inactivity timer, and/or iv) an SL DRX retransmission timer;

receiving, by the second user UE from the base station, configuration information that includes i) information for a resource pool in which an SL DRX is not supported and ii) information for a resource pool in which the SL DRX is supported;

receiving, by the second UE from a first UE, sidelink control information (SCI) that includes i) a first stage SCI on a physical sidelink control channel (PSCCH), and ii) a second stage SCI on a physical sidelink shared channel (PSSCH); and receiving, by the second UE from the first UE, sidelink data based on the SCI, wherein the SCI is received based on a monitoring related to the SCI, wherein based on a slot in which the SCI is received, an SL DRX active time is determined, wherein the SL DRX active time includes a time duration in which an SL DRX timer is running, and the SL DRX timer is the SL DRX Onduration timer, the SL DRX inactivity timer, or the SL DRX retransmission timer, wherein based on a resource pool including the slot in which the SCI is received, whether to perform an operation related to the SL DRX is determined, wherein based on i) the SL DRX HARQ RTT timer related to a retransmission of the sidelink data being started, ii) a first slot within a time duration, in which the SL DRX HARQ RTT timer is running, belonging to the resource pool in which the SL DRX is not supported, the monitoring related to the SCI is performed in the first slot.

2. The method of claim 1, wherein based on the resource pool including the slot in which the SCI is received being the resource pool in which the SL DRX is supported, the operation related to the SL DRX is performed.

3. The method of claim 1, wherein based on i) the resource pool including the slot in which the SCI is received being the resource pool in which the SL DRX is supported, and ii) a transmission of the sidelink data scheduled by the SCI being a new sidelink transmission, the SL DRX inactivity timer is started after the slot in which the SCI is received.

4. The method of claim 1, wherein based on a second slot within the time duration belonging to the resource pool in which the SL DRX is supported, a monitoring related to the first stage SCI is performed and a monitoring related to the second stage SCI is skipped, in the second slot.

5. The method of claim 1, wherein based on the resource pool including the slot in which the SCI is received being the resource pool in which the SL DRX is not supported, the operation related to the SL DRX is not performed.

6. A second user equipment (UE) comprising:

one or more transceivers;

one or more processors configured to control the one or more transceivers; and one or more memories operably connected to the one or more processors, wherein the one or more memories are configured to store instructions performing operations based on being executed by the one or more processors, wherein the operations comprise:

receiving, from a base station, sidelink (SL) discontinuous reception (DRX) configuration information, wherein the SL DRX configuration information includes information for a plurality of SL DRX timers that include i) an SL DRX Hybrid Automatic Repeat Request (HARQ) Round Trip Time (RTT) timer, ii) an SL DRX Onduration timer, iii) an SL DRX inactivity timer, and/or iv) an SL DRX retransmission timer;

receiving, from the base station, configuration information that includes i) information for a resource pool in which an SL DRX is not supported and ii) information for a resource pool in which the SL DRX is supported;

receiving, from a first UE, sidelink control information (SCI) that includes i) a first stage SCI on a physical sidelink control channel (PSCCH), and ii) a second stage SCI on a physical sidelink shared channel (PSSCH); and receiving, from the first UE, sidelink data based on the SCI, wherein the SCI is received based on a monitoring related to the SCI, wherein based on a slot in which the SCI is received, an SL DRX active time is determined, wherein the SL DRX active time includes a time duration in which an SL DRX timer is running, and the SL DRX timer is the SL DRX Onduration timer, the SL DRX inactivity timer, or the SL DRX retransmission timer, wherein based on a resource pool including the slot in which the SCI is received, whether to perform an operation related to the SL DRX is determined, wherein based on i) the SL DRX HARQ RTT timer related to a retransmission of the sidelink data being started, ii) a first slot within a time duration, in which the SL DRX HARQ RTT timer is running, belonging to the resource pool in which the SL DRX is not supported, the monitoring related to the SCI is performed in the first slot.

* * * * *